United States Patent [19]
Chen

[11] Patent Number: 5,982,760
[45] Date of Patent: Nov. 9, 1999

[54] METHOD AND APPARATUS FOR POWER ADAPTATION CONTROL IN CLOSED-LOOP COMMUNICATIONS

[75] Inventor: Tao Chen, San Diego, Calif.

[73] Assignee: Qualcomm Inc., San Diego, Calif.

[21] Appl. No.: 08/879,274

[22] Filed: Jun. 20, 1997

[51] Int. Cl.⁶ .............................. H04B 7/216; H04B 1/38
[52] U.S. Cl. ........................... 370/335; 455/69; 455/522
[58] Field of Search ................................. 370/277, 278, 370/318, 328, 329, 331, 332, 333, 335–342, 491, 496; 455/522–68, 69–442, 13.4, 437

[56] References Cited

U.S. PATENT DOCUMENTS

| | | | |
|---|---|---|---|
| 4,112,257 | 9/1978 | Frost ................................... | 179/2 EB |
| 4,123,718 | 10/1978 | Lampert et al. ...................... | 325/474 |
| 4,765,753 | 8/1988 | Schmidt ................................. | 379/60 |
| 4,777,653 | 10/1988 | Bonnerot et al. ..................... | 455/69 |
| 4,811,421 | 3/1989 | Havel et al. .......................... | 455/69 |
| 4,868,795 | 9/1989 | McDavid et al. ..................... | 367/77 |
| 4,870,698 | 9/1989 | Katsuyama et al. .................. | 455/67 |
| 4,901,307 | 2/1990 | Gilhousen et al. .................... | 370/18 |
| 5,056,109 | 10/1991 | Gilhousen et al. ................... | 375/1 |
| 5,093,840 | 3/1992 | Schilling .............................. | 375/1 |
| 5,101,501 | 3/1992 | Gilhousen et al. .................... | 455/33 |
| 5,103,459 | 4/1992 | Gilhousen et al. ................... | 375/1 |
| 5,107,487 | 4/1992 | Vilmur et al. ........................ | 370/18 |
| 5,128,965 | 7/1992 | Henriksson .......................... | 375/58 |
| 5,204,876 | 4/1993 | Bruckert et al. ..................... | 375/1 |
| 5,220,678 | 6/1993 | Feei ..................................... | 455/69 |
| 5,245,629 | 9/1993 | Hall ..................................... | 375/1 |
| 5,257,283 | 10/1993 | Gilhousen et al. ................... | 375/1 |
| 5,265,119 | 11/1993 | Gilhousen et al. ................... | 375/1 |
| 5,267,261 | 11/1993 | Blakeney, II et al. ................ | 370/335 |
| 5,267,262 | 11/1993 | Wheatley, III ....................... | 375/1 |
| 5,305,468 | 4/1994 | Bruckert et al. ..................... | 455/69 |
| 5,383,219 | 1/1995 | Wheatley, III et al. .............. | 375/1 |
| 5,390,338 | 2/1995 | Bodin et al. ......................... | 455/33.1 |
| 5,450,616 | 9/1995 | Rom .................................... | 455/69 |
| 5,461,639 | 10/1995 | Wheatley, III et al. .............. | 455/522 |
| 5,465,399 | 11/1995 | Oberholtzer et al. ................ | 455/69 |
| 5,485,486 | 1/1996 | Gilhousen et al. ................... | 370/335 |
| 5,487,180 | 1/1996 | Ohtake ................................. | 455/54.1 |
| 5,566,206 | 10/1996 | Butler et al. ......................... | 375/225 |
| 5,590,409 | 12/1996 | Sawahashi et al. .................. | 455/69 |
| 5,621,723 | 4/1997 | Walton, Jr. et al. .................. | 370/335 |
| 5,842,113 | 11/1998 | Nanda et al. ........................ | 455/69 |
| 5,878,329 | 3/1999 | Mallinckrodt ....................... | 455/522 |
| 5,903,554 | 5/1999 | Saints .................................. | 370/342 |

FOREIGN PATENT DOCUMENTS

| | | |
|---|---|---|
| 9406218 | 3/1994 | WIPO ............................. H04Q 7/04 |
| 9419876 | 9/1994 | WIPO . |
| 9521494 | 8/1995 | WIPO . |
| 9703403 | 1/1997 | WIPO . |

*Primary Examiner*—Min Jung
*Attorney, Agent, or Firm*—Russell B. Miller; Sean S. English; Kent D. Baker

[57] ABSTRACT

The present invention provides a method and apparatus for providing improved power control in a closed-loop communication system. A base station monitors a quality of a feedback link between it and a mobile station under a variety of methods. When a quality of the feedback link becomes unacceptable, the base station and the mobile station enter into an alternative mode of operation, adjusting from a fast power control feedback mode (with a high bandwidth feedback channel and low power control delay), to a slow power control feedback mode (with a low bandwidth feedback channel or a long power control delay). The mobile station adjusts a rate or content of power control messages it feeds back to the base station under a variety of methods. Under this alternative mode, the mobile station increases a power of its feedback signals. Additionally, if the mobile station is in a soft handoff condition, it similarly increases a power of its feedback signals. If the base station determines that the received power control messages are unacceptable, the base station employs power control messages it receives from a base station controller.

142 Claims, 10 Drawing Sheets

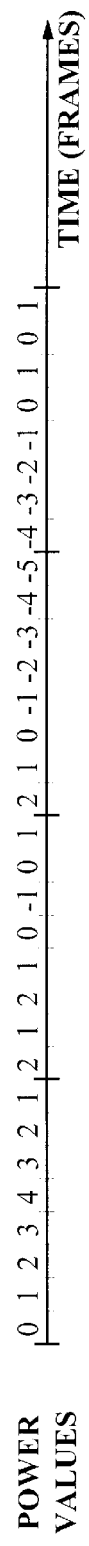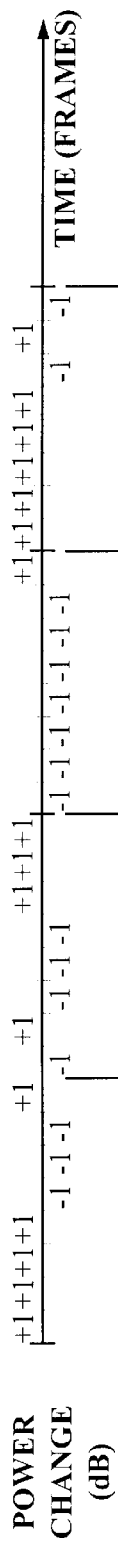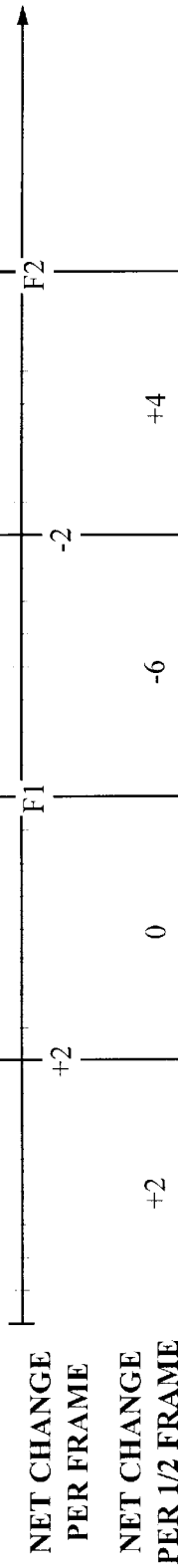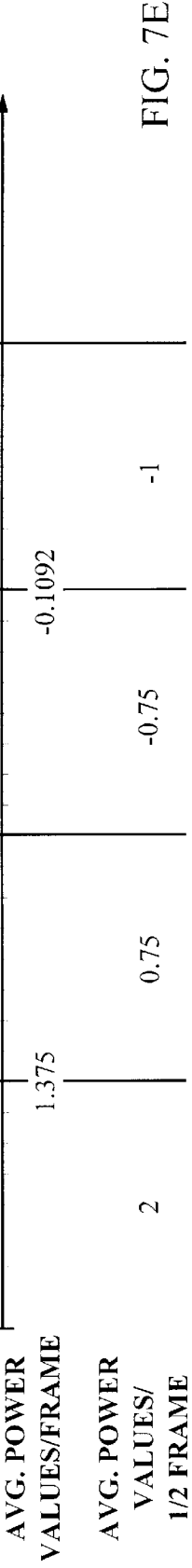
FIG. 7B
FIG. 7C
FIG. 7D
FIG. 7E

METHOD AND APPARATUS FOR POWER ADAPTATION CONTROL IN CLOSED-LOOP COMMUNICATIONS

BACKGROUND OF THE INVENTION

I. Field of the Invention

The present invention relates to communication systems. More particularly, the present invention relates to a method and apparatus for providing closed loop power control in a wireless communication system.

II. Description of the Related Art

The use of code division multiple access (CDMA) modulation techniques is one of several techniques for facilitating communications in which a large number of system users exist. Other multiple access communication system techniques, such as time division multiple access (TDMA) and frequency division multiple access (FDMA) are known in the art. However, the spread spectrum modulation techniques of CDMA have significant advantages over other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention, and is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," also assigned to the assignee of the present invention, and is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user or mobile station through two or more cell-sites. Furthermore, path diversity may be obtained by exploiting the multipath environment through spread spectrum processing by allowing a signal arriving with different propagation delays to be received and processed separately. Examples of receivers taking advantage of available path diversity are described in detail in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390, entitled "DIVERSITY RECEIVER IN A CDMA CELLULAR TELEPHONE SYSTEM," both assigned to the assignee of the present invention and incorporated by reference herein.

If the transmission power of signals transmitted by the base station to a mobile station are too high, it can result in unnecessary interference to other users and reduced system capacity. Alternatively, if the transmission power of signals transmitted by the base station are too low, then the mobile station will receive multiple erroneous transmitted frames. Terrestrial channel fading and other known factors can affect the transmission power of signals transmitted by the base station, so that channel conditions change over time, especially as the mobile station moves. As a result, each base station must rapidly and accurately adjust the transmission power of signals which it transmits to the mobile stations.

In a useful method for controlling the transmission power of signals transmitted by a base station, the mobile station measures the quality of received signals. The mobile station then transmits a signal indicating the measured power level of the received signal, or compares the power level of the received signal to a threshold value and transmits a signal or message to the base station when the power of a received signal deviates from the threshold. In response to the received signal, the base station adjusts its transmission power of the signal to that mobile station; If the power level of the received signal is lower than the threshold, the base station increases the transmission power of its transmitted signals, otherwise, the transmission power is decreased. A method and apparatus for performing power is disclosed in U.S. Pat. No. 5,056,109, entitled "METHOD AND APPARATUS FOR CONTROLLING TRANSMISSION POWER IN A CDMA CELLULAR TELEPHONE SYSTEM," assigned to the assignee of the present invention and incorporated by reference herein.

A delay necessarily exists under the above closed-loop power control system. The delay includes the time when the base station transmits the frame with inadequate power, when the mobile station receives the degraded or erroneous frame, when the mobile station recognizes the error (e.g., signal falls below the threshold or a frame is erased), when the mobile station transmits an appropriate error message to the base station, and when the base station receives the error message and adjusts its transmission power in response. The digital wireless communication systems, typically, transmit packets of data as discrete frames. As a result, these CDMA communications system cannot rapidly compensate for transmission power fluctuations. Additionally, the mobile station could make multiple requests for increases in the forward link transmission power before recognizing the effects of such requests due to the delay.

Furthermore, the bandwidth of the channel over which the mobile station relays signals to the base station can be limited. For example, nearly all of the bandwidth for this channel is dedicated to transmitting voice traffic to the base station. Little or no bandwidth remains to transmit signals to the base station reflecting the measured power level of the signals transmitted by the base station. Therefore, such signals transmitted by the mobile station could only request that the base station increase or decrease the transmission power by a fixed amount. Consequently, if deep fades affect the transmitted signals, the base station may not be able to react quickly enough to increase its transmission power and calls can be undesirably terminated.

SUMMARY OF THE INVENTION

The present invention solves problems of currently existing closed loop power control systems, by adapting its method of operation to the operating characteristics of the power control system. Under the first mode of operation, the communication system determines that it is operating in a fast feedback mode where the delay is short in executing commands between the mobile station and the base station and/or the bandwidth of a reverse link channel between the mobile station and the base station is high. In the second mode of operation, the present invention operates in a second mode of operation, wherein the communication systems determines that it is operating in a slow feedback mode when the delay is great and/or the bandwidth is narrow. As noted above, mobile stations typically send signals or messages over a feedback or reverse link channel to the base station, where the messages indicate the quality or power level of each frame or portions of the frame received in the forward link channel. If the mobile station detects a change in power on the forward channel, the mobile station provides a message to the base station to request that the forward channel be increased or decreased.

The present invention provides a method and apparatus for providing improved power control in a closed-loop communication system. A base station preferably monitors the quality of the feedback link between it and a mobile station under a variety of methods. When the quality of the feedback link becomes unacceptable, the base station and the mobile station preferably enter into an alternative mode of operation, adjusting from a fast power control feedback mode (with a high bandwidth feedback channel and short power control delay), to a slow power control feedback mode (with a low bandwidth feedback channel or a long power control delay). The mobile station adjusts a rate or content of power control messages it feeds back to the base station under a variety of methods. Under this alternative mode, the mobile station can increase the power of its feedback signals. Similarly, if the mobile station is in a soft handoff condition, it can increase a power of its feedback signals. If the base station determines that the received power control messages are unacceptable, the base station can employ power control messages it receives from a base station controller.

In a broad sense, the present invention embodies a method for controlling transmission signal power in a communication system. The communication system has at least one base station and at least one user station. The method includes the steps of: (a) determining a quality of the currently received communication signal; (b) transmitting power control messages over a feedback channel based on said quality of said currently received communication signal; (c) determining that a quality of said feedback channel is unacceptable; (d) transmitting a feedback control message after determining that said quality of said feedback channel is unacceptable; and (e) adjusting said transmission of said power control messages in response to said determined feedback quality.

The present invention also embodies an apparatus in a communication system having a base station and a user station. The apparatus includes a receiver, a measurement circuit, a transmitter and a processor. The receiver receives a current signal and a feedback control message from a first station. The first station is either the base station or the user station. The measurement circuit is coupled to receive the current signal as configured to determine a level of the current signal. The transmitter transmits a current control message to a second station corresponding to the level of the current signal. The second station is the other of the base station or user station. The processor is coupled to the receiver, the transmitter and the measurement circuit. The processor is configured to adjust control messages transmitted to the second station by the transmitter in response to the feedback control message.

BRIEF DESCRIPTION OF THE DRAWINGS

The features and advantages of the present invention will become more apparent from studying the detailed description together with the following figures. In the figures, like reference characters identify similar elements.

FIG. 7B is a plot of absolute transmission power values over time for the waveform diagram of FIG. 7A.

FIG. 7C is a plot of change in transmission power over time for the waveform diagram of FIG. 7A.

FIG. 7D shows net changes in transmission power per frame and per one-half of a frame, for the plot of changes in transmission power of FIG. 7C.

FIG. 7E shows averaged power values per frame, and per one-half of a frame, for the absolute power values of FIG. 7B.

DETAILED DESCRIPTION OF THE PREFERRED EMBODIMENTS

A communication system, and in particular, a power control apparatus and method for the system, is described in detail herein. In the following description, numerous specific details are set forth such as numbers of bits, power levels of signals, etc., in order to provide a thorough understanding of the present invention. One skilled in the relevant art, however, will readily recognize that the present invention can be practiced without these specific details, or with other numbers of bits, levels of signals, etc. In other instances, well-known structures are not shown in detail in order to avoid obscuring the present invention.

Figure 1:
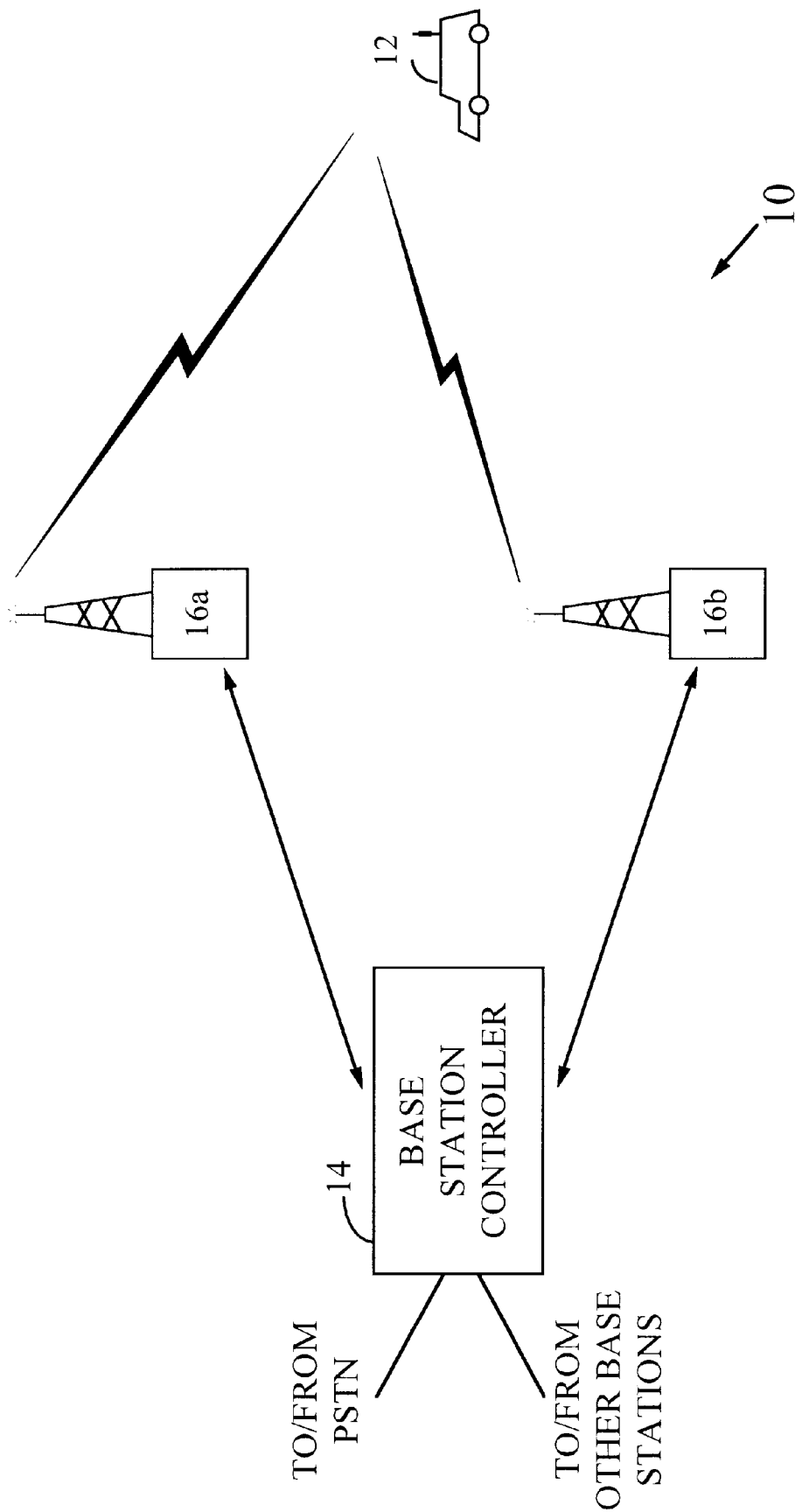
FIG. 1 illustrates a general closed-loop power control system of the present invention.

FIG. 1 illustrates exemplary cellular subscriber communication system 10 in which the present invention may be embodied. The system of FIG. 1 preferably utilizes spread spectrum modulation techniques such as CDMA for communicating between users of mobile stations (e.g., mobile telephones) and cell-sites or base stations. In FIG. 1, mobile station 12 communicates with base station controller 14 by means of one or more base stations 16a, 16b, etc. Base station controller 14 is coupled to and typically includes interface and processing circuitry for providing system control to base stations 16a and 16b. Base station controller 14 can also be coupled to and communicate with other base stations, and possibly even other base station controllers.

When system 10 is configured to process telephone calls, base station controller 14 routes telephone calls from a public switched telephone network (PSTN) to base station 16a or 16b for transmission to the appropriate mobile station 12. Also, base station controller 14 functions to route calls from mobile station 12 via at least one base station 16a or 16b to the PSTN. Base station controller 14 can also connect calls between mobile stations 12 and other mobile stations (not shown).

Base station controller 14 can be coupled to base stations 16a and 16b by various means such as dedicated telephone lines, optical fiber links or microwave communication links. Double-arrowed lines shown in FIG. 1 define the possible communication links between mobile station 12 and base stations 16a and 16b, and between the base stations and base station controller 14.

Each of the base stations 16a and 16b provides service to a roughly defined, but overlapping, geographical region known as a cell. In which cell mobile station 12 is currently located will, in general, determine which base station 16a or 16b communicates with the mobile station. When mobile station 12 moves from one cell to another, then base station controller 14 will coordinate a handoff ("soft handoff") from one base station to another, for example, from base station 16a to base station 16b. Those skilled in the art will recognize that a handoff may occur for other reasons besides movement of mobile station 12 from one geographic cell site to another, such as changes in system usage.

Figure 2:
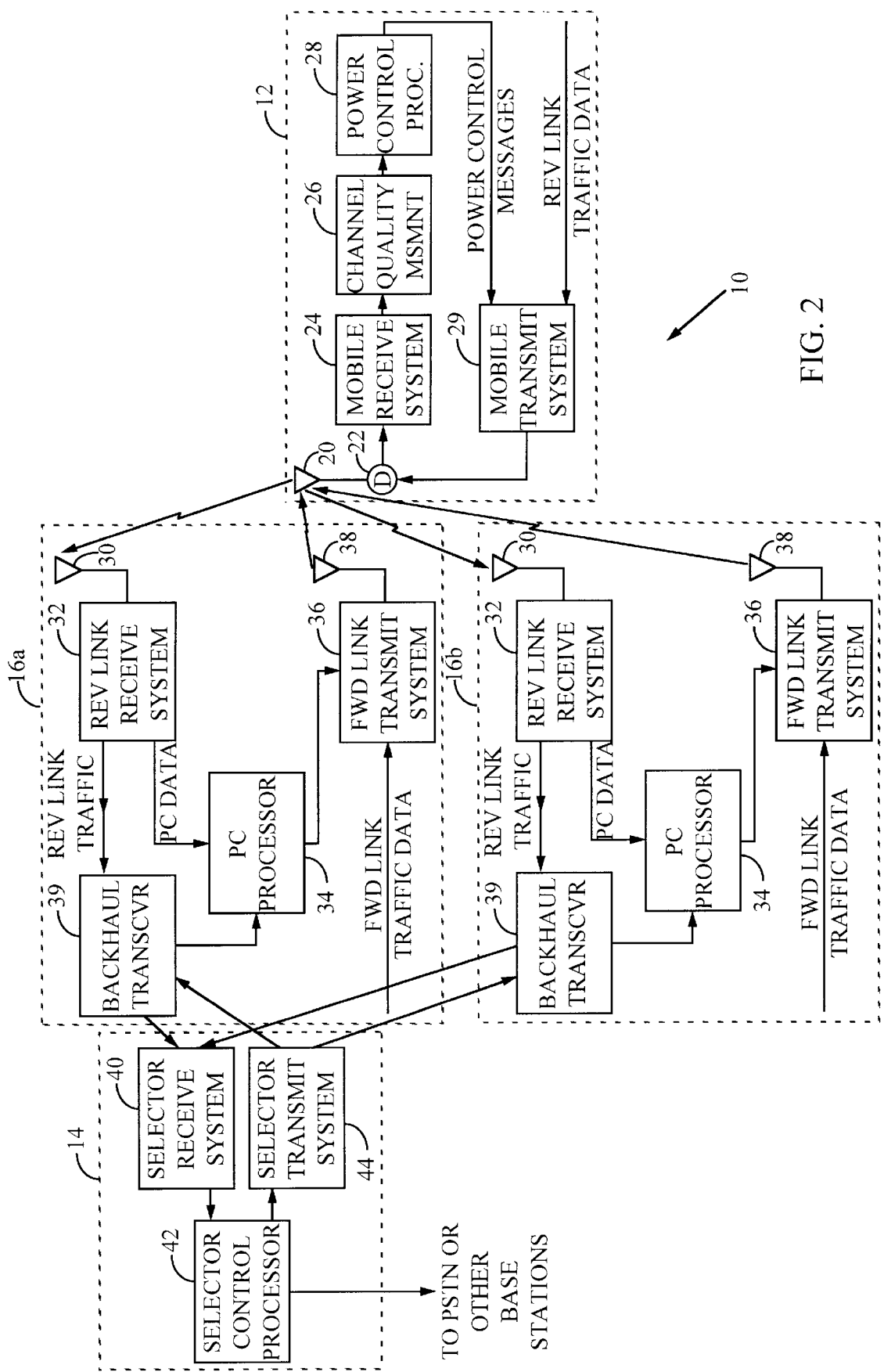
FIG. 2 is a block diagram of the closed-loop power control system of FIG. 1.

FIG. 2 illustrates the situation where mobile station 12 is in soft handoff between the cell covered by base station 16a and the cell covered by base station 16b. It will be understood that description is easily extended the situation where only one base station 16a or 16b is in communication with mobile station 12 and to the case where more than two base stations are in communication with the mobile station.

Referring to the block diagram of communication system 10 in FIG. 2, mobile station 12 includes antenna 20 that transmits signals to, and receives signals from, base stations 16a and 16b. Duplexer 22 provides a forward link channel or signal from base stations 16a and 16b to mobile receiver system 24 (mobile RCV system). Receiver system 24 down-converts, demodulates and decodes the received signal. Receiver system 24 then provides a predetermined parameter or set of parameters to quality measurement circuit 26. Examples of parameters might include frame erasures, measured signal to noise ratio (SNR), measured received power, or decoder parameters such as symbol error rate, Yamamoto metric, or parity bit check indication.

Channel quality measurement circuit 26 receives the parameters from mobile receiver system 24 and determines a quality measurement signal or power level of the received signal. Quality measurement circuit 26 can compute energy per bit ($E_b$) or energy per symbol ($E_s$) measurements from portions or windows of each frame. Preferably, the energy per bit or energy per symbol measurements are normalized (e.g., $E_b/N_o$), or normalized and include interference factors (e.g., $E_b/N_t$). Based on these measurements, quality measurement circuit 26 generates the power level signal.

Power control processor 28 receives the power level signal from quality measurement circuit 26, compares the signal to a threshold and produces a power control message based on the comparison, as described in detail below. Each power control message can indicate a change in power for the forward link signal. Alternatively, power control processor 28 produces power control messages representing the absolute power of the received forward link signal, as described below. Power control processor 28 produces preferably several (e.g., sixteen) power control messages in response to several power level signals per frame. Currently, forward link power control one time per frame reverse link power control sixteen times per frame. While the quality measurement circuit 26 and power control processor 28 are generally described herein as separate components, such components can be monolithically integrated, or the operations performed by such components can be performed by a single microprocessor.

Mobile transmission system 29 (Mobile Transmit System) encodes, modulates, amplifies and up converts the power control messages, via duplexer 22 and antenna 20. In the exemplary embodiment, mobile transmission system 29 provides the power control message in a predetermined location of an outgoing reverse link frame. Alternatively, power control data can be transmitted separately as signaling data. Mobile transmission system 29 also receives reverse link traffic data which can correspond to voice or data from the user of mobile station 12.

Each base station 16a and 16b includes receiving antenna 30 that receives the reverse link frames from mobile station 12. Receiver systems 32 of base stations 16a and 16b down convert, amplify, demodulate and decode the reverse link traffic. In addition, receiver systems 32 separate the power control messages from each reverse link traffic frame and provide the power control messages to power control processor 34. Henceforth, much of the description of the present invention is described with respect to only a single base station 16a. Unless otherwise noted herein, the description applies equally to second base station 16b.

Power control processor 34 monitors the power control messages and produces a forward link transmitter power signal to forward link transmitter system 36. Forward link transmitter system 36, in response thereto, either increases, maintains, or decreases the power of the forward link signal. The forward link signal is transmitted via transmitting antenna 38. Additionally, power control processor 34 analyzes the quality of the reverse link signal from mobile station 12, and provides appropriate feedback control messages to forward link transmitter system 36, as described below. Forward link transmitter 36, in response thereto, transmits the feedback control messages via transmitting antenna 38 over the forward link channel to mobile station 12. Forward link transmitter system 36 also receives forward link traffic data which it encodes, modulates and transmits via antenna 38. In the exemplary embodiment, mobile receiver system 24, mobile transmission system 29, receiver system 32 and transmitter system 36 are either a CDMA receiver or transmitter as described in the aforementioned U.S. Pat. Nos. 4,901,307 and 5,103,459, under the exemplary embodiment.

Unless described otherwise below, the construction and operation of the various blocks shown in FIG. 2 are of conventional design. As a result, such blocks need not be described in further detail herein, as they will be understood by those skilled in the relevant art. Such description is omitted for purposes of brevity and so as not to obscure description of the present invention. Any modifications necessary to the blocks of communication system 10 in FIG. 2 can be readily made by one skilled in the art based on the detailed description provided herein.

As described in detail below, communication system 10 provides multi-mode forward link power control where the communication system adaptively changes between at least two power control modes. It should be noted that power control of the mobile stations reverse link transmission similarly can be adjusted. The selection of such power control modes is based, in part, on power control delays inherent in the communication system 10, and the quality of the reverse link channel or "feedback channel." The quality of the reverse link channel can determine whether communication system 10 provides high or low bandwidth feedback. Because the exemplary embodiment of the present invention controls the bay station transmit power, the terms "reverse link channel" and "feedback channel" are generally used interchangeably herein.

Figure 3:
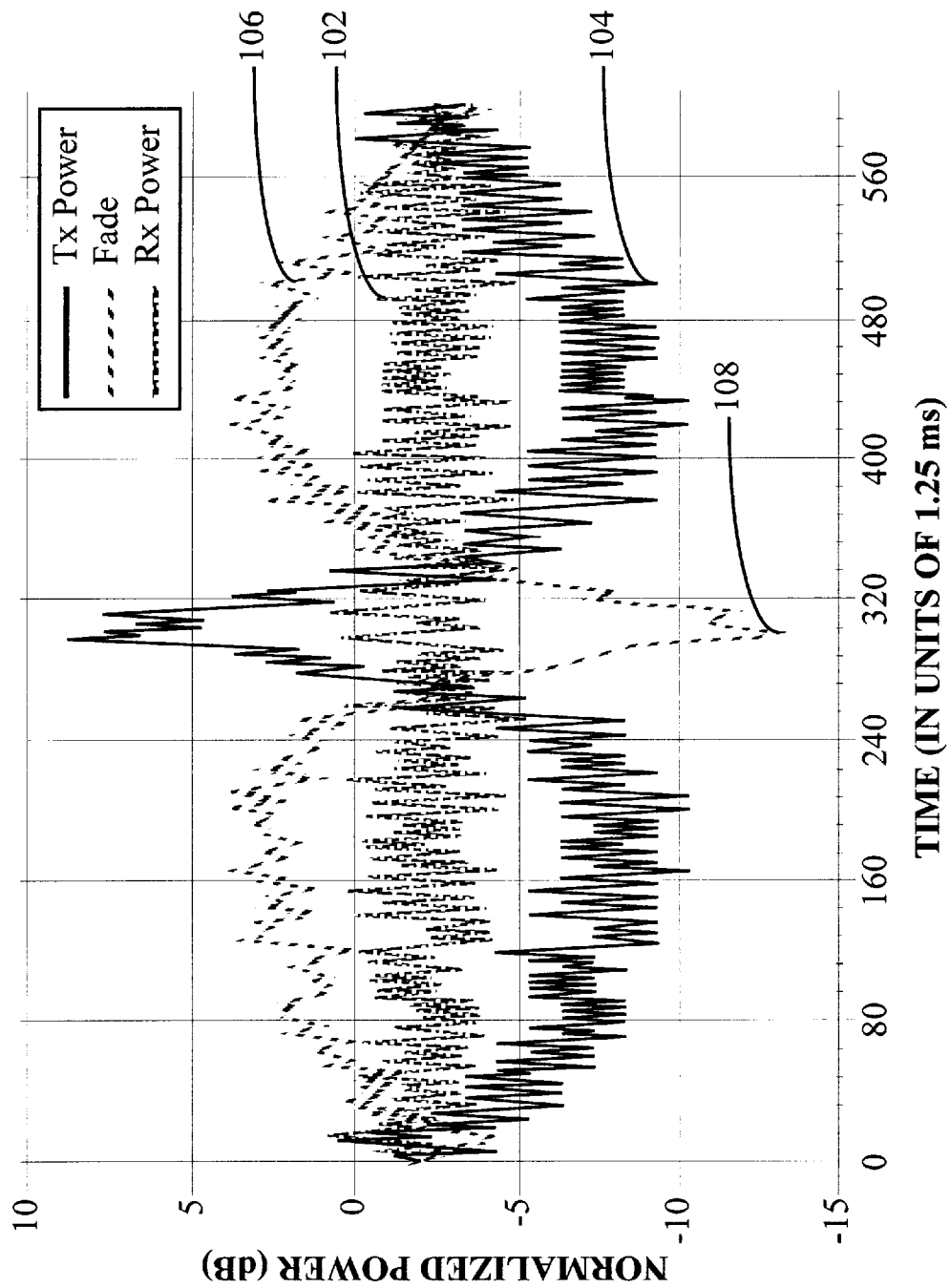
FIG. 3 is an exemplary waveform diagram of normalized power versus time for a transmitted power signal of a forward link channel, fading affecting the forward link channel, and a resulting received power signal of the forward link channel, where a reverse link channel has a large bandwidth and small delay compared with channel change rate.

Referring to FIG. 3, an exemplary first mode of the power control system under the present invention will be discussed. In general, limiting factors in typical closed-loop power control systems are the bandwidth of power control feedback channel and a delay in executing instructions. The feedback channel, such as the reverse link channel between mobile station 12 and base station 16a, carries instructions to the base station from the mobile station requesting a change in the transmission power of the forward link signal. The delay (hereinafter referred to as the "power control delay"), as noted above, includes the time when base station 16a transmits a frame with inadequate power, when mobile station 12 receives the degraded frame, when the mobile station recognizes the degradation, when the mobile station transmits an appropriate power control message to the base station, and when the base station receives the power control message and appropriately adjusts its transmission power.

If the reverse link channel over which mobile station 12 transmits its power control messages has a high bandwidth in terms of bits of information per second (i.e., has a high feedback channel bandwidth) then mobile station 12 can provide multi-bit power control messages that represent, for example, a quantized measurement of the absolute power value of the received forward link signal. In response thereto, base station 16a can directly adjust the transmitted power of the forward link signals to a desired level, rather than incrementally over a period of several windows or frames. Likewise, with a short power control delay (compared to the rate at which channel conditions change), communication system 10 can rapidly adjust to changes in the forward link channel conditions, and thereby avoid dramatic overshoots or undershoots from the desired level that can be caused by a long power control delay. Consequently, with a high feedback channel bandwidth and a short power control delay, communication system 10 can compensate for most changes in channel condition to provide a desirable transmission power of the forward link signals.

FIG. 3 shows an exemplary received normalized power signal 102 corresponding to the power of the forward link signal as received by mobile station 12, an exemplary transmission power signal 104 corresponding to the power of the forward link signal transmitted by base station 16a, and exemplary fading 106 effecting the forward link channel. Received power signal 102, as received by mobile station 12 is a combination of transmission power signal 104 of the forward link signal from base station 16a, combined with fading 106 effecting the forward link channel. As shown in FIG. 3, transmission power signal 104 changes frequently, and inversely, in response to changes in fading 106 effecting the forward link channel. Rapid, and at times large, changes in transmission power signal 104 can cause received power signal 102 to sometimes overshoot or undershoot a desired power level, such as a desired level of −2 dB. Nevertheless, communication system 10 under the first mode provides agile power control so as to quickly correct for such overshoots or undershoots and provide high forward link channel quality and power savings compared with a communication system lacking power control.

For example, with a slow fading forward link channel where the change in received power signal 102 is less than 3–4 dB per 20 millisecond frame length, mobile station 12 in the exemplary embodiment provides 16 power control messages per frame. Thus, each frame is divided into 16 windows during which received power signal 102 is analyzed. Under the exemplary first mode, the power control delay has a delay of less than 2/16 of a frame if the reporting rate is 16 times per frame. Mobile station 12 measures and transmits an absolute power level measured during each window or a net difference between the measured power level during each window and a power level threshold, as described below.

In the exemplary embodiment, the power control delay is approximately 2.5 milliseconds. As a result, communication system 10 can accurately adjust for slow channel fading so as to follow changes in the channel. As shown in FIG. 3, an exemplary deep but brief fade 108 effects the forward link channel. In response thereto, mobile station 12 provides power control messages to base station 16a, which in response thereto, increases the transmission power of the forward link signal. Therefore, transmission power signal 104 is increased at peak 110 to counteract deep fade 108. Consequently, mobile station 12 will typically receive the forward link signal with sufficient received power to permit the mobile station to demodulate and decode the forward link signal.

Figure 4:
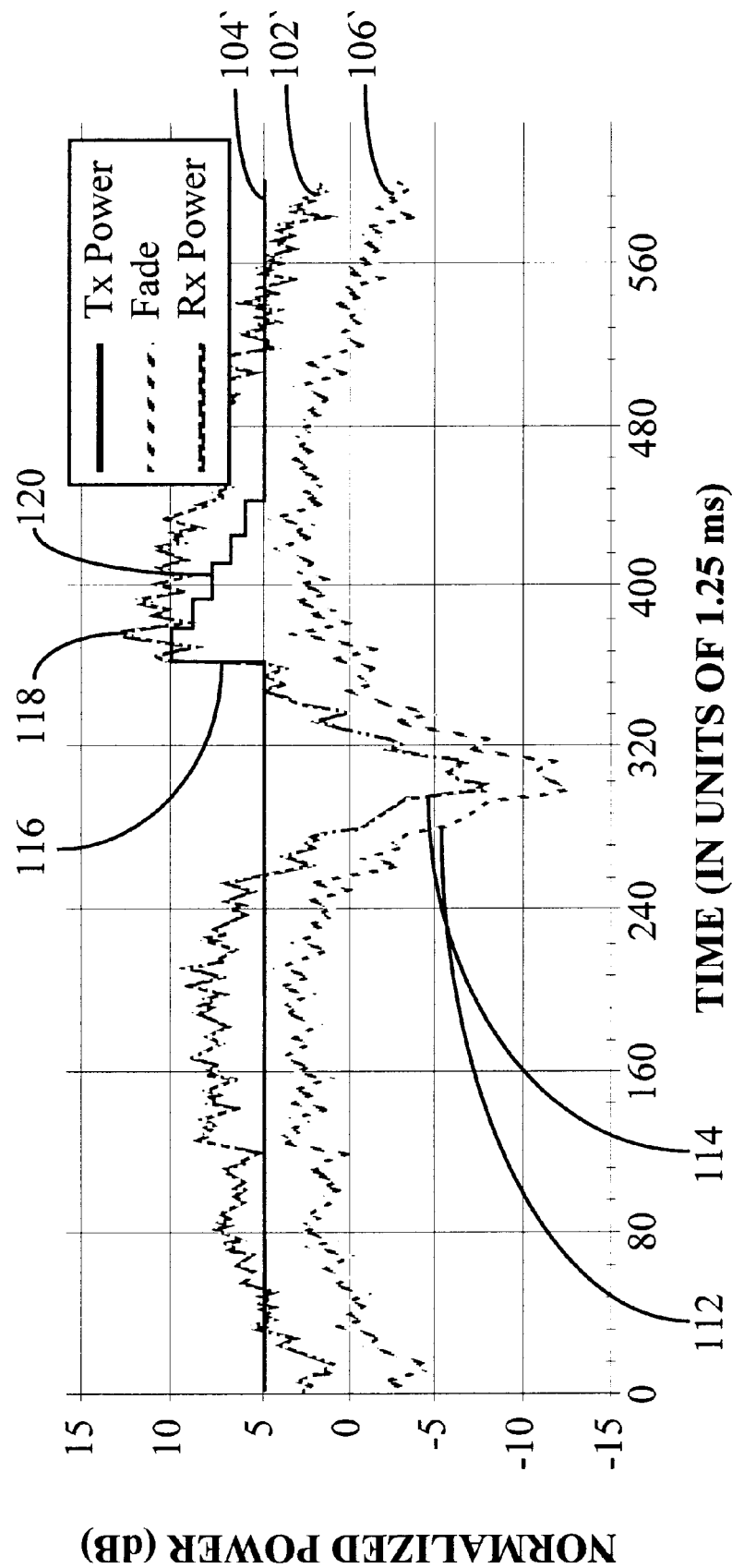
FIG. 4 is an exemplary waveform diagram of normalized power versus time for the transmitted power signal of a forward link channel, fading affecting the forward link channel, and the resulting received power signal of the forward link channel, where the reverse link channel has a small bandwidth and long delay compared with channel change rate.

Referring to FIG. 4, an exemplary second mode of the power control system under the present invention will be discussed. Under the second mode, the reverse link channel has a low feedback channel bandwidth. As a result, mobile station 12 can provide only limited power control messages, such as reduced bit count messages or fewer messages per frame, where each message requests the forward link signal to be increased or decreased. In response thereto, base station 16a adjusts the transmitted power of the forward link signal by either increasing the power by a large amount, on decreasing the power by a relatively smaller amount. Similarly, the reverse link channel under the second mode has a long power control delay, and thus communication system 10 can only slowly adjust to changes in the forward link channel conditions. Consequently, with a low feedback channel bandwidth and a long power control delay, communication system 10 compensates for changes in channel condition much more slowly and less accurately.

FIG. 4 shows exemplary received power signal 102 corresponding to the power of the forward link signal as received by mobile station 12, exemplary transmission power signal 104 corresponding to the power of the forward link signal transmitted by base station 16a, and exemplary fading 106 affecting the forward link channel. Under the second mode where the feedback channel bandwidth is small, or the power control delay is long, communication system 10 conservatively maintains forward link transmission power at a relatively high minimum level, such as +5 dB as shown in FIG. 4. As a result, if the forward link channel suffers from a prolonged and deep fade, the increased forward link transmission power helps prevent such a fade from seriously affecting the forward link channel and helps prevent calls from being prematurely terminated ("dropped"). In other words, while transmission power is not as efficiently used in the second mode as in the first mode, such a relatively high minimum power level is typically adequate for most changes in the forward link channel conditions.

Under the exemplary second mode, the power control delay can be fine frames or longer. Each frame can be divided into less than 16 windows (possibly as few as one window per frame, as discussed below), during which received power signal 102' is analyzed by comparing it to a power level threshold. Alternatively, the power control feedback channel can carry messages indicating detected frame errors. Mobile station transmits a net difference or simply an increase or decrease command as a few, or as little as one bit per frame. As a result, when base station 16a ultimately determines that the forward link channel condition is worsening and requires an increase in transmission power, the base station rapidly raises the transmission power level of the forward link signal by a large amount (e.g., +5 dB or a frame error results). Base station 16a then decreases the power level more slowly at small increments compared with the relatively large increase in power, because power control processor 34 cannot know whether the worsening channel condition corresponds to a temporary fade, or a sustained worsening channel condition.

For example, as shown in FIG. 4, an exemplary deep fade 112 causes received power signal 102 to correspondingly suffer from a decrease in power. After received power signal 102 falls below a predetermined level (e.g. below −5 dB), mobile station 12 transmits a power control message requesting base station 16a to increase transmission power signal 104. Several frames thereafter, transmission power signal 104 is increased by +5 dB to a +10 dB peak 116. Deep fade 112, however, is only temporary, and thus received power signal 102 jumps above the desired level, to a peak 118 of about +12 dB.

After peak 116, base station 16a receives subsequent power control messages from mobile station 12 indicating that no increase is necessary, and thus, the base station incrementally decreases transmission power signal 104' over subsequent frames in a staircase-like fashion 120 until the transmission power returns to its minimum level of +5 dB. Due to the long power control delay, however, received power signal 102 maintains a high level after peak 118. Such a high received power signal 102' is generally wasted power in communication system 10. More details on power control methods for low feedback channel bandwidth or long power control delay are described in, for example, one of the co-inventor's co-pending U.S. patent applications entitled "METHOD AND APPARATUS FOR PERFORMING DISTRIBUTED FORWARD POWER CONTROL," Ser. No. 08/710,335 filed Sep. 16, 1996, assigned to the assignee of the present invention, and incorporated by reference herein.

Figure 5A:
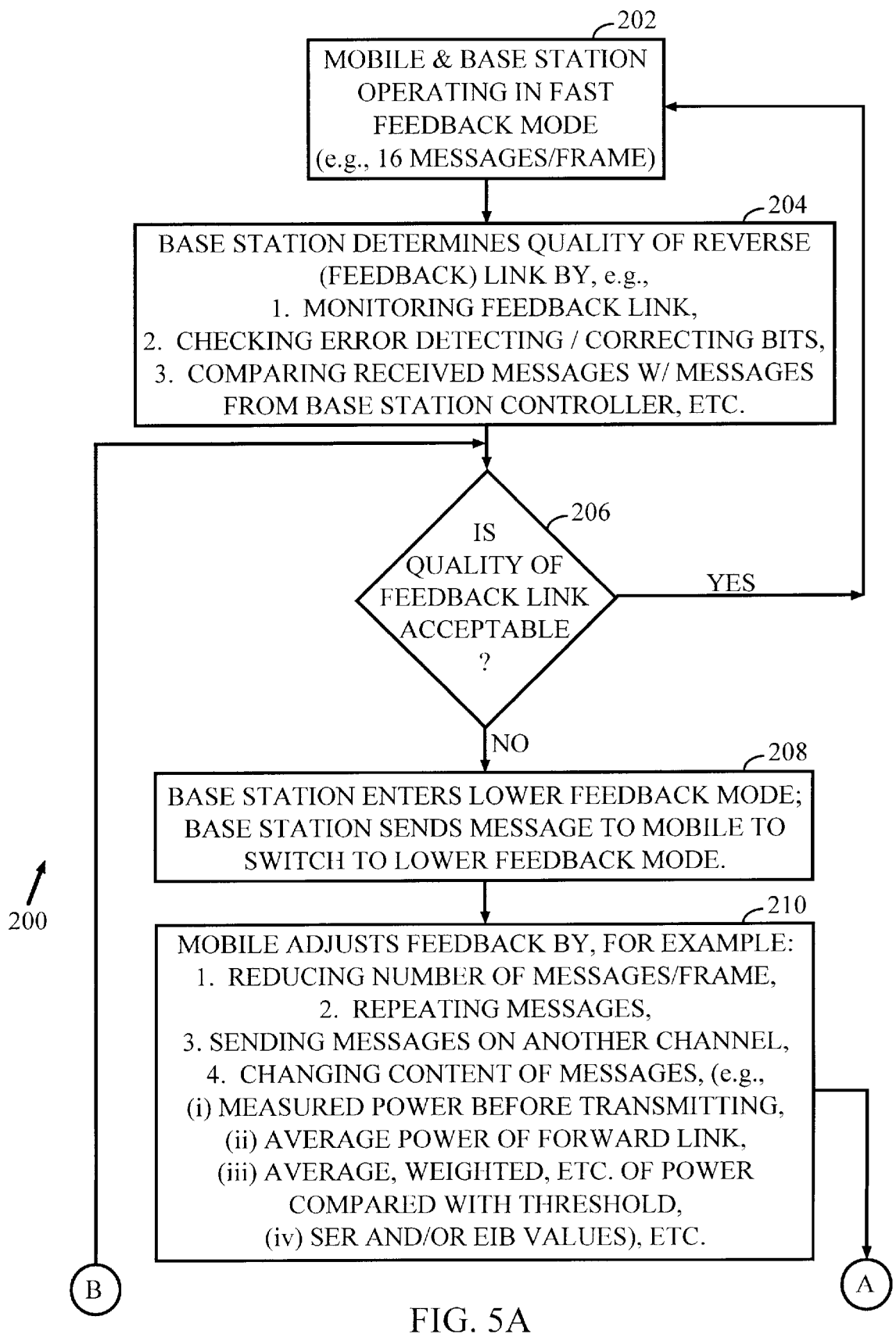
FIGS. 5A–5B are exemplary flow diagrams which together show a method for monitoring the reverse link channel and adjusting reverse link signals.
Figure 5B:
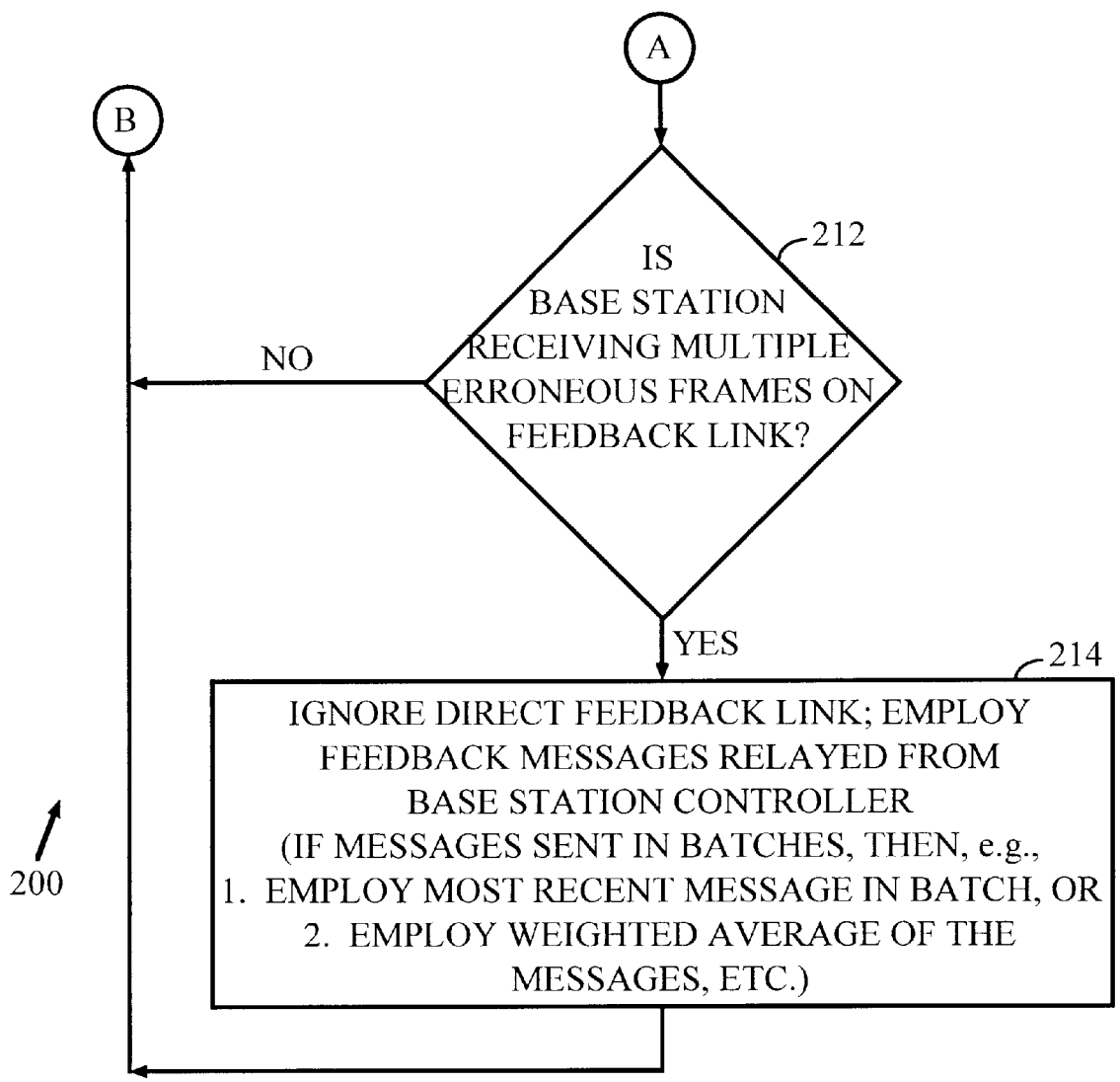

Referring to the flowchart of FIGS. 5A and 5B, a routine 200 performed by communication system 10 adjusts a rate, content or other aspects of power control messages based on a measured reduction in a quality of the feedback channel (i.e., reverse link channel). Those skilled in the relevant art can create source code based on the flowchart of FIGS. 5A and 5B and the detailed description provided herein. Routine 200, and other routines described herein, are preferably performed by, and stored in memory (not shown) that forms part of, power control processors 28 and 34.

In step 202, communication system 10 begins by operating under the exemplary first mode. The reverse link channel has a high bandwidth and the power control delay is short, so that mobile station 12 provides multiple power control messages (e.g., 16 messages per frame) to base station 16a. In step 204, base station 16a determines a quality of the reverse link channel by one of several methods. For example, base station 16a in step 204 can monitor a power level of the received reverse link signal. Since the quality of the reverse link signal relates to a power level of the signal, base station 16a and other base stations can monitor a power level of the reverse link signal to determine a quality of the power control messages transmitted thereon. If base station 16a determines that the power level of the reverse link signal falls below a preselected threshold, then the base station determines in step 206 that power control messages received over the reverse link channel are likely erroneous, and thus, the reverse link channel quality is degraded or unacceptable.

Under a first alternative method of determining the reverse link channel quality, base station 16a in step 204 analyzes a quality of each power control message. For example, base station 16a analyzes error detection coding in the received power control messages. Under this first alternative, each power control message includes error detection bits, such as cyclic redundancy check ("CRC") bits which are generated under known methods by mobile station 12. Base station 16a then compares the received CRC bits for each power control message with the data in the message to determine whether the received message contains errors.

Alternatively, mobile station 12 encodes error correction bits with each power control message. Under this alternative, mobile station 12 employs any of a variety of conventional error correction methods to produce error correction bits for each power control message based on the data contained within each message. As a result, base station 16a can, not only, detect errors in each received power control message, but also correct for one or more errors in each message. While the use of error detection bits in each power control message requires a greater feedback channel bandwidth than if power control messages lacked such bits, use of error correction bits requires an even greater feedback channel bandwidth. As the feedback channel bandwidth increases, mobile station 12 can provide a greater number of error correction bits, and thus base station 16a can correct for greater numbers of errors in each power control message. If base station 16a determines from error detection bits that several consecutive messages contain errors, or with error correction bits cannot correct for errors in several messages, the base station determines that the reverse link channel quality is unacceptable.

In a second alternative method of determining the reverse link channel quality, base station 16a in step 204 compares power control messages received from mobile station 12 with power control messages from base station 16b, as relayed to base station 16a by base station controller 14. When in soft handoff, base stations 16a, 16b, and possibly other base stations each receive power control messages from mobile station 12. Base stations 16a, 16b, etc. each interpret the messages and relay the interpreted power control messages to base station controller 14. Base station controller 14 selects the best or highest quality power control message, which is typically the message received by the base station having the highest quality reverse link channel. Base station controller 14 then sends the highest quality power control message to base stations 16a, 16b, etc. Each base station, such as base station 16a, compares the power control message it received from mobile station 12 with the highest quality power control message to determine a quality of the reverse link channel. If the received power control message differs significantly from the highest quality power control message, base station 16a in step 206 determines that the reverse link channel quality is unacceptable. In an alternative embodiment, base station controller 14 can determine the quality of the feedback link and base station 16a and 16b will act on that determination.

In a third alternative method of determining the reverse link channel quality, which is similar to the second alternative method, base station controller 14 averages the power control messages it receives from base stations 16a, 16b, etc. The averaged power control message is then transmitted to base stations 16a, 16b, etc. Each base station, such as base station 16a, compares the power control message it received from mobile station 12 to the averaged power control message. If the received power control message differs significantly, or is below, a value of the averaged power control message, base station 16a determines in step 206 that the reverse link channel quality is unacceptable.

In a fourth alternative method of determining the reverse link channel quality, power control messages transmitted by mobile station 12 represent a voltage value based on a comparison of the received power of the forward link signal compared to the power level threshold. The voltage value includes both a magnitude of a difference between the received power level and the threshold, and a polarity indicating a positive or negative difference from the threshold. Base station controller 14 receives the power control messages from each base station 16a, 16b, etc., and determines which power control message more accurately represents the required change in the forward link transmission power. For example, if base station 16a provides a power control message having a value of −0.1, while base station 16b provides a power control message having a value of +2, base station controller 14 determines that the value of +2 is likely correct, and thus the transmission power should be increased. The −0.1 value is closer to a positive value than the +2 value is to a negative value. In other words, the magnitude and polarity of the received power control messages provide a level of confidence to base station controller 14 as to which of such messages is correct. Base station controller 14 then provides the "correct" power control message having a value of +2 to all of the base stations.

Alternatively, base station controller 14 can combine the values of the received power control messages by, for example, adding the values. Under the previous example, such an additive value would be +1.9 (i.e., +2+(−0.1)=+1.9. Each base station, such as base station 16a, compares the power control message it received from mobile station 12 to the "additive" power control message received from base station controller 14. If the received power control message differs significantly from the additive power control message, base station 16a in step 206 determines that the reverse link channel quality is unacceptable.

In general, base station 16a in step 206 determines if a quality of the reverse link signal is acceptable based on the determination performed under previous step 204. For example, as noted above, if the power control messages include error detection bits, and base station 16a determines that the error detection bits check for a power control message currently examined, the base station determines that the reverse link channel quality is acceptable. Thereafter, routine 200 loops back to step 202.

Alternatively, if base station 16a operates under the second alternative method discussed above with respect to step 204, and determines that the currently received power control message differs significantly from the highest quality power control message, then the base station determines that the quality of the reverse link signal is unacceptable. Thereafter, under step 208. base station 16a enters into the second or lower feedback mode.

In step 208, base station 16a initially increases the transmission power of the forward link signal. For example, as shown in FIG. 4, base station 16a increases the transmission power of the forward link signal to a minimum value of +5 dB; however, other values may be employed. Additionally, in step 208, base station 16a transmits a feedback control message to mobile station 12 over the forward link channel, which instructs the mobile station to adjust the transmission of its reverse link signal to the base station under one of several possible methods discussed below.

In step 210, mobile station 12 receives the feedback control message from base station 16a and adjusts the reverse link signal it feeds back to the base station over the reverse link channel. Such adjustment generally provides less power control performance over the first mode. For example, under step 210, mobile station 12 reduces a number of power control messages transmitted during each frame. While mobile station 12 transmits power control messages in the exemplary first mode, the mobile station transmits only eight or fewer power control messages during each frame under the second mode. Mobile station 12 transmits only eight absolute transmission power values measured at eight specific intervals during each frame. The eight specific intervals can be selected windows analyzed during each frame, with or without gaps between each window of a frame (e.g., every other window, every third window, etc.). As a result, mobile station 12 transmits power control messages at a slower rate under the second mode, as opposed to the first mode.

Under a first alternative method of adjusting the reverse link signal, mobile station 12 widens each observation window per frame during which the mobile station determines the transmission power level of the forward link. For example, if each frame is 20 milliseconds in duration, each window can be extended from, e.g., 1.25 milliseconds to 2.5 milliseconds. As a result, mobile station 12 transmits a reduced number of power control messages, and thus a reduced number of bits, per frame. If the transmission power level of the reverse link channel is maintained from the transmission power level under the first mode to the second mode, the power per bit increases over the reverse link channel, since there are a reduced number of bits.

Figure 6A:
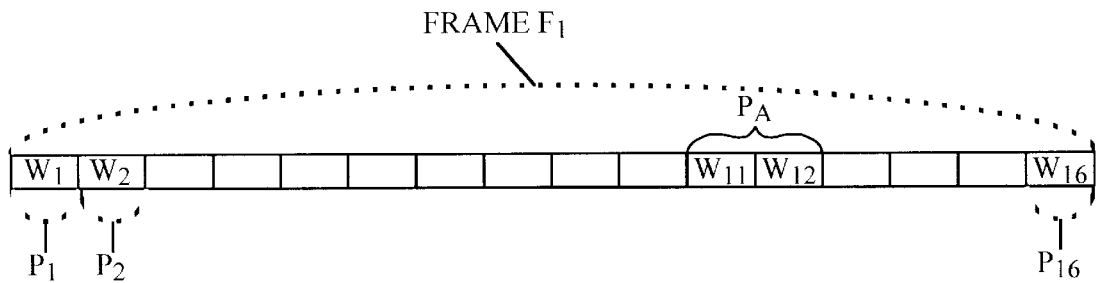
FIG. 6A is a schematic diagram showing multiple, non-overlapping analysis portions of the forward link signal.

Under a second alternative method of adjusting the reverse link signal, mobile station 12 adjusts an analysis portion during which one or more windows in one or more frames are analyzed and power control messages sent to base station 16a in response to such analysis. As generally used herein, the term "analysis portion" refers to either a frame, two or more frames, or a portion of a frame. The portion of a frame can be as small as a single window within each frame (e.g., $\frac{1}{16}$ of a frame.) For example, as shown in FIG. 6A, a frame F1 is divided into 16 windows $W_1$, $W_2$ . . . $W_{16}$. Under the exemplary first mode, each analysis portion $P_1$ through $P_{16}$ is equal to the width or duration of each window. Analysis portion $P_1$ corresponds to window $W_1$, analysis portion $P_2$ corresponds to window $W_2$, and so on. Under the second alternative method, mobile station 12 transmits fewer power control messages during each frame, where each analysis portion includes more than one window. As shown in FIG. 6A, an exemplary analysis portion $P_A$ includes two windows $W_{11}$ and $W_{12}$. Under a method similar to the first method described above for step 210, since each exemplary analysis portion $P_A$ includes two of sixteen windows per frame, mobile station 12 transmits only eight power control messages per frame.

Figure 6B:
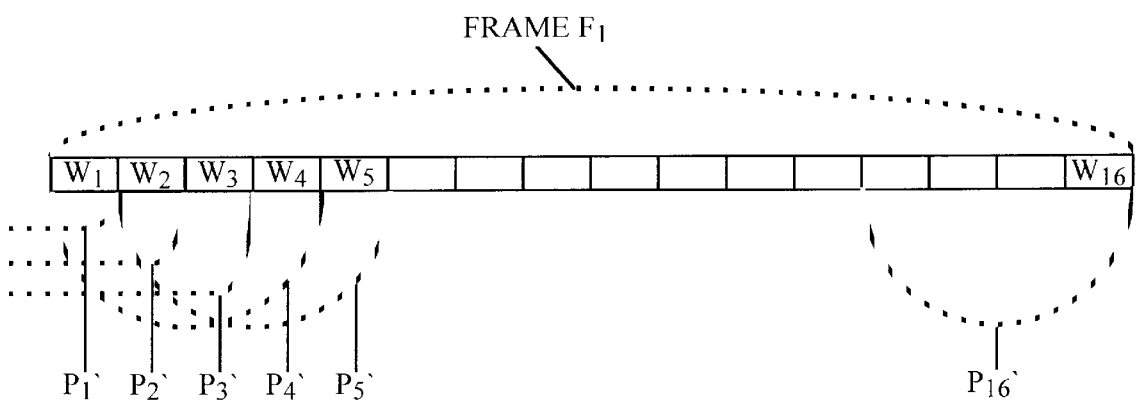
FIG. 6B is a schematic diagram showing multiple, overlapping analysis portions of the forward link signal.

Under a third alternative method of adjusting the reverse link signal, mobile station 12 in step 210 employs analysis portions which overlap with adjacent analysis portions. As shown in FIG. 6B, each analysis portion $P'_1$, $P'_2$ . . . $P'_{16}$ is equal to a duration of four windows. For example, analysis portion $P'_4$ includes windows $W_1$–$W_4$. However, power control messages are provided at a rate of 16 per frame. Therefore, analysis portion $P_1$ includes a first window $W_1$, as well as the three previous windows in a previous frame. The next analysis portion $P'_2$ includes the first two windows $W_1$ and $W_2$ of the frame F1, as well as the two previous windows in the previous frame, and so on. Such overlapping windows are desirable when the reporting rate of power control messages increases, such as if the quality of the reverse link channel improves. Additionally, if each analysis portion represents an average of the windows in each period (as discussed below), then such an averaging over overlapping windows tends to filter out spurious and rapid changes in the measured power of the forward link signal, such as high peaks and low fades that are only of a very brief duration. Furthermore, if each analysis portion represents an average of the windows in the portion, then base station 16a can more accurately follow changes in the transmission power of its forward link signal if occasional power control messages are not received by the base station.

Under a fourth alternative method of adjusting the reverse link signal, mobile station 12 in step 210 adjusts a reporting rate at which power control messages are transmitted to base station 16a in lieu of, or in addition to, a change in the analysis portion. As generally used herein, the term "reporting rate" refers to a rate at which mobile station 12 transmits power control messages to base station 16a. The reporting rate can be as rapid as 16 or more transmitted power control messages per frame, or as few as one power control message transmitted over several frames.

Under a fifth alternative method of adjusting the reverse link signal, mobile station 12 in step 210 repeats power control messages during each frame, or over several frames. For example, mobile station 12 can measure or determine a transmission power level of the forward link signal during a first quarter of each frame, and then transmit the same measured power four times over each frame.

Under a sixth alternative method of adjusting the reverse link signal, mobile station 12 in step 210 transmits power control messages on another reverse link channel. For example, mobile station 12 can employ four logical channels over the reverse link channel: a first channel for voice or data, a second channel for a pilot signal, a third channel for the power control messages, and a fourth channel for multipurpose use. Mobile station 12 can transmit the power control messages over the fourth channel if the third channel is determined in step 206 to be degraded.

Alternatively, if only a single logical channel is employed on the reverse link channel, mobile station 12 can suppress a certain number of symbols per frame (representing voice traffic), and insert therefor power control messages. Mobile station 12 can insert the power control messages prior to encoding the voice traffic bit stream. Conversely, mobile station 12 can add power control messages to the subsequently encoded stream of symbols, or a "puncture" the stream of symbols. Such a puncturing of the encoded symbol stream can occur more rapidly than if the power control messages are inserted prior to encoding. However, base station 16a may have more difficulty in separating encoded symbols for voice as opposed to power control messages in the received symbol stream, than if the power control messages were inserted prior to encoding the voice traffic bit stream.

Figure 7A:
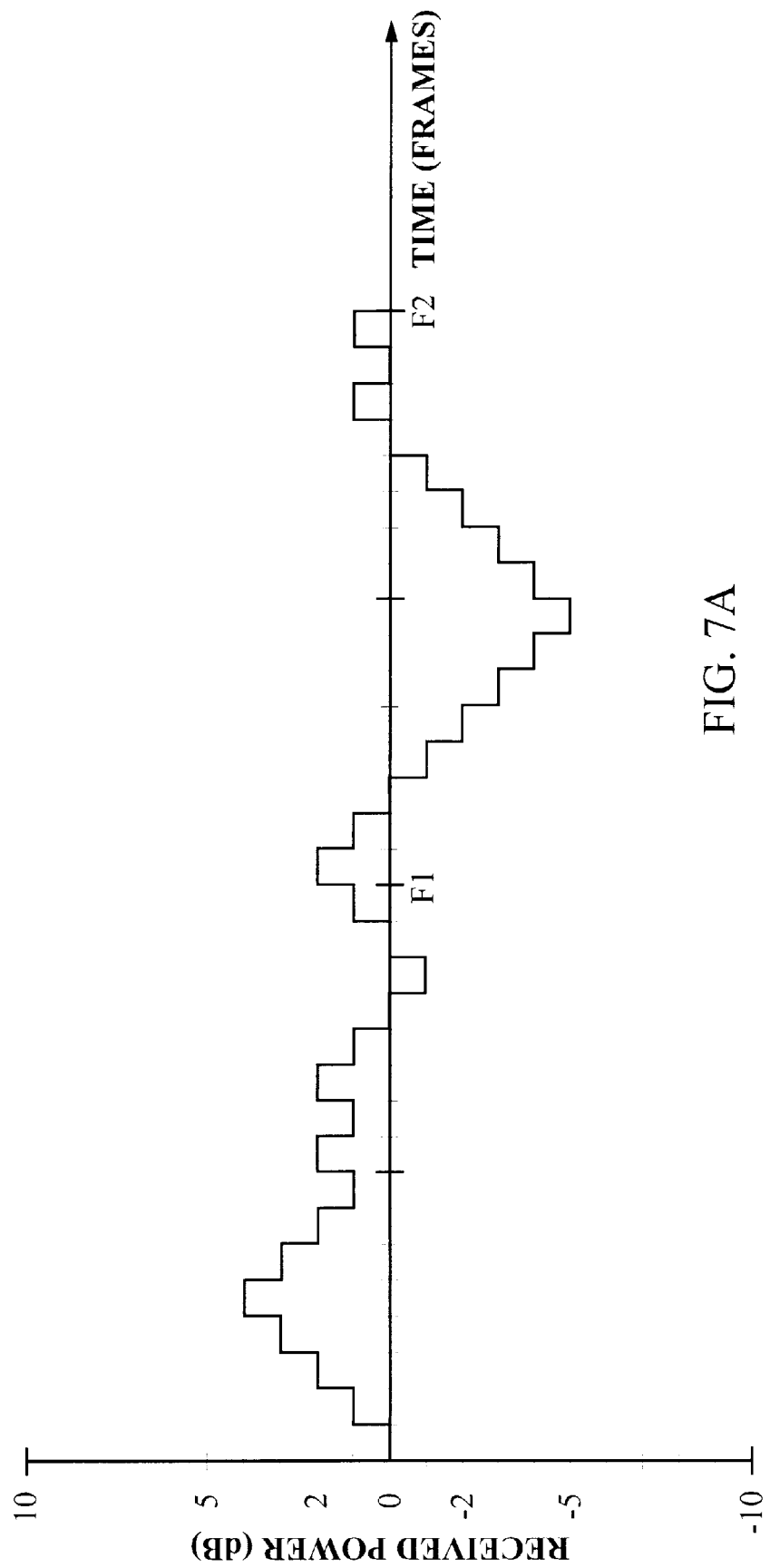
FIG. 7A is a waveform diagram of transmitted power versus time showing multiple, incremental changes in the transmission power of the forward link channel.

Under a seventh alternative method of adjusting the reverse link signal, mobile station 12 measures the power of the received forward link signal once during an analysis portion and sends one power control message during each of such analysis portions. Referring to FIG. 7A, an exemplary waveform of the received power signal of the forward link signal is shown for a period of two frames F1 and F2. Each frame F1 and F2 is divided into 16 windows while FIG. 7B shows corresponding power values measured during each window for the waveform. Under the exemplary first mode, mobile station 12 can transmit the absolute power level measured during each of the 16 windows of each frame, as shown in FIG. 7B. Under this alternative method of the second mode, mobile station 12 can transmit a power level of the received forward link signal during the last (16th) window of each frame. Therefore, mobile station 12 transmits a power control message indicating a value of 1 dB for frame F1, and likewise a similar value of 1 dB for frame F2.

Under an eighth alternative method of adjusting the reverse link signal, mobile station 12 compares the received power of the forward link signal to the power level threshold, and transmit only the net difference of this comparison during each analysis portion. The analysis portion can also overlap with adjacent analysis portions. For example, if the power level threshold is established at 0 dB, then the measured power values shown in FIG. 7B are the net difference between the measured received power for each window and the threshold.

Under a ninth alternative method of adjusting the reverse link signal, mobile station 12 simply transmits single bit power control messages during each window which reflect a change in the measured received power of the forward link signal. For example, mobile station 12 transmits a binary "1" value for each window where the received power signal is greater than that of a previous window, and a 0 value if it is less than the previous window. As shown in FIG. 7C, the received power signal changes frequently during the first frame F1, as shown by the series of values "+1, +1, +1, +1, −1, −1, −1, +1, −1, +1, −1, −1, −1, +1, +1, +1", for which mobile station 12 transmits 16 corresponding power control messages having the series of binary values "1111000101000111". Under this ninth alternative method (or a tenth alterative method discussed below), base station 16a must have received a fairly accurate indication of the absolute power level of the forward link signal before communication system 10 enters into the second mode under is method.

Under a tenth alternative method of adjusting the reverse link signal, mobile station 12 transmits power control messages that reflect a net change if the received power over the analysis portion. As shown in FIG. 7D, a net change of the 16 power change values in frame F1 is +2, while the net change over frame F2 is −2. If the analysis portion is equal to 1 frame (16 windows) and the reporting rate is equal to 1 power control message per frame, then mobile station 12 transmits power control messages having values of +2 and −2 for frames F1 and F2. By decreasing the analysis portion to twice per frame and doubling the reporting rate, a net change for the first and second halves of frame F1 (for the first and second group of eight windows) is +2 and 0, respectively, while the first and second halves of frame F2 have net changes of −6 and +4.

Under an eleventh alternative method of adjusting the reverse link signal mobile station 12 averages the received power of the forward link signal over the analysis portion and transmits power control messages reflecting such averages. As shown in FIG. 7E, if the measured power of the forward link signal is averaged over each frame, then mobile station 12 transmits power control messages of 1.375 and −0.1092 as averages over frames F1 and F2, respectively. Alternatively, if the analysis portion is equal to one-half of each frame, the received power is similarly averaged over one-half of each frame. Consequently, mobile station 12 transmits power control messages having values of 2 and 0.75 for the first and second halves of frame F1, and −0.75 and −1 for the first and second halves of frame F2, respectively.

Under a twelfth alternative method of adjusting the reverse link signal, mobile station 12 determines, over the analysis portion, an average weighted value of the received power as compared with the power level threshold. The averaging can be of equal weight in a finite window employing known finite impulse response filtering ("FIR" filtering), or of unequal weight in a finite window using FIR filtering. For example, with unequal weighting over a finite three window analysis portion, mobile station 12 multiplies the power value of the current window by 1, the power value of the previous window by 0.66, and the power value of the next previous window by 0.33, before averaging the three resulting values. Various other weighting schemes can be employed based on empirical data derived through testing, based on information provided to mobile station 12 in the feedback control messages transmitted by base station 16a, etc.

Alternatively, mobile station 12 can average received power values based on an unequal weight in an infinitely long window employing known infinite impulse response filtering ("IIR filtering"). In general, such weighted averaging methods weigh a current, measured power value in a current window more than the weighting of measured values in previous windows. Mobile station 12 can average, under any of the averaging methods described above, either the absolute power value of the received forward link signal, or the net difference of the signal as compared to the power level threshold.

Under a thirteenth alternative method to adjusting the reverse link signals mobile station 12 transmits power control messages containing re-encoded symbol error rates ("SERs") for each analysis portion. Base station 16a then determines a quality of the reverse link channel by analyzing the symbol error rates. If the symbol error rates drop to an acceptable value, then base station 16a determines that the reverse link channel has sufficiently improved that communication system 10 should revert back to the first mode.

Under a fourteenth alternative method of adjusting the reverse link signal mobile station 12 transmits power control messages that include erasure indicator bits ("EIBs") for a frame, in a method similar to that described above with respect to symbol error rates. The EIB message implicitly indicates a power level of the currently received frame because if the EIB indicates that a current frame is erased, it is likely that the forward link signal received by mobile station 12 has insufficient power. For example, mobile station 12 determines whether an entire frame in the received forward link signal contains errors or is erased. In response thereto, mobile station 12 produces an EIB message for each frame that indicates whether a currently received frame contains an erasure. An EIB binary value of "0" can indicate an acceptable received frame, while a value of "1" can indicate an erased frame. Such EIB power control messages can be punctured into the voice traffic on the reverse link channel. Base station 16a, in turn, determines a quality of the reverse link channel by analyzing the EIB messages.

Under a fifteenth alternative method of adjusting the reverse link signal, mobile station 12 "fine tunes" its power control messages over a multiframe period. Mobile station 12 monitors its performance and determines whether the power control messages it feeds back to base station 16a regularly and incorrectly request, for example, a +1 dB power increase over a 10-window long period. If so, mobile station 12 provides an appropriate power control message to automatically request a 1 dB decrease every 10 windows to compensate for this error. Alternatively, the power control threshold of mobile station 12 can be adjusted by a fractional amount, if the mobile station 12 provides power control messages which represent a comparison of the received power level as compared with the threshold. For example, if mobile station 12 recognizes that 20% of its power control messages request an incorrect increase in the forward link signal, then the threshold can be adjusted downward by 20%.

Under a sixteenth alternative method of adjusting the reverse link signal, mobile station 12 continues to operate under the first mode, as well as providing revised power control messages under the second mode. For example, mobile station 12 can transmit SER and/or EIB values once every few frames together with the voice traffic on the reverse link channel. Alternatively, mobile station 12 can transmit two different types of power control messages, under two of the methods described above, where each message is transmitted over a separate channel. The power control messages can be matched to the channel (e.g., multi-bit power control messages transmitted over a high bandwidth feedback channel, and single bit power control messages transmitted over a narrower bandwidth feedback channel). Base station 16a can then determine a quality of each channel, and employ the power control message received over the higher quality channel.

Overall, under step 210, mobile station 12 provides a variety of methods of adjusting the reverse link signal in response to feedback control messages received by base station 16a. Mobile station 12 can combine two or more of the various methods described above. For example, mobile station 12 can provide one of the averaging methods over an analysis portion that is equal to a frame, thereby reducing the feedback rate, expanding the analysis portion and providing an averaging for power control messages. In addition, mobile station 12 can increase the reporting rate so that more than one power control message is transmitted during each frame (albeit repeated).

In general, the particular feedback control method employed by mobile station 12 depends on a variety of factors, such as empirically derived test data, a quality and bandwidth of the reverse link channel, the power control delay of communications system 10, etc. The feedback control messages transmitted by base station 16a can request that mobile station 12 perform a specific one of the various methods under step 210. Alternatively, mobile station 12 can rank its various feedback control methods. Therefore, after first receiving a feedback control message from base station 16a, mobile station 12 performs a first method that corresponds to a least degraded reverse link channel (e.g., where the reverse link channel still has a relatively high bandwidth and short power control delay). After receiving each subsequent power control message, mobile station 12 can thereafter employ subsequent power control methods under the ranking, which correspond to further degradations in the reverse link channel.

In step 212, base station 16a determines whether it is receiving multiple erroneous frame in the reverse link signal, and if not, the routine 200 loops back to step 206 where the base station again determines a quality of the reverse link channel. If the reverse link channel is still unacceptable, then base station 16a can transmit a feedback control message to mobile station 12 instructing the mobile station to perform an alternative feedback method under step 210, as noted above.

If base station 16a receives multiple erroneous frames, the base station determines in step 212 that the reverse link channel has sufficiently degraded that the power control messages it receives from mobile station 12 are unreliable. Therefore, in step 214, base station 16a ignores power control messages received from mobile station 12 over the reverse link channel. Instead, base station 16a employs power control messages relayed to it from base station controller 14. As noted above, during soft handoff, two or more base stations receive power control messages from mobile station 12 and transmit the received messages to base station controller 14. Base station 16a can then employ a highest quality or averaged power control message which it receives from base station controller 14. When base station 16a employs power control messages relayed to it from base station controller 14, communication system 10 typically suffers from a power control delay of five frames or longer. Details on such a delay are described in the above-noted U.S. patent application, entitled "METHOD AND APPARATUS FOR PERFORMING DISTRIBUTED FORWARD POWER CONTROL." As a result of such delay, base station controller 14 can Provide groups or batches of power control messages to base station 16a. Base station 16a, in response thereto, can employ various methods of analyzing and using the batches of power control messages. For example, base station 16a can employ a most recent power control message in each batch. Alternatively, base station 16a can employ an average of such messages, a weighted average of such messages in a batch, a weighted average of messages within more than one batch, and so forth.

With batches of power control commands, base station 16a can quickly change from an existing power level to a revised power level, rather than incrementally over a period of time. For example, if each batch corresponds to a 16-window frame, a current power level of the transmitted forward link signal is at +1 dB, and base station 16a receives a batch corresponding to frame F1 of FIG. 7C, then the net change for the frame F1 is +2 dB. Therefore, base station 16a, in response thereto, immediately increases the transmission power by +2 dB, to a total power level of +3 dB. In general, base station 16a can employ many of the methods described above under step 210 when employing power control messages it receives in batches from base station controller 14.

After performing step 214, base station 16a loops back to step 206 where the base station again determines the quality of the reverse link channel. Overall, base station 16a under routine 200 determines a quality of the reverse link channel. If a quality of the channel degrades, base station 16a instructs mobile station 12 to employ alternative or adjusted feedback control methods, such as adjusting a rate or content of power control messages which it transmits to base station 16a. If a quality of the reverse link channel significantly degrades, base station 16a employs power control messages it receives from base station controller 14.

Figure 8:
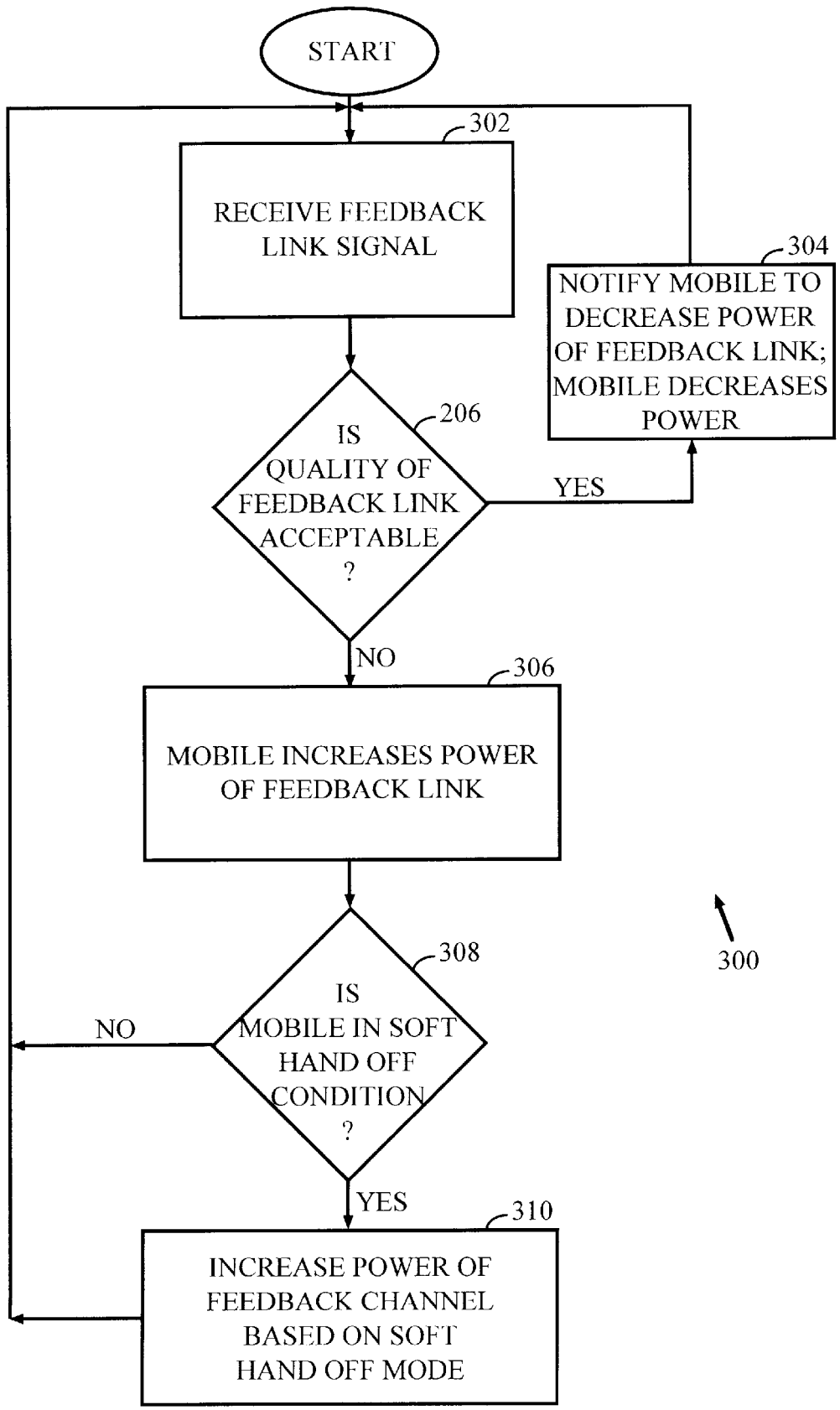
FIG. 8 is an exemplary flow diagram showing a method for controlling power on the reverse link channel in response to changes in quality of the reverse link channel and in response to soft handoff conditions.

Referring to FIG. 8, under a routine 300, mobile station 12 adjusts the transmission power of the reverse link channel in response to changes in quality of the reverse link channel and in response to soft handoff conditions. The routine 300 can be performed in parallel with the steps of the routine 200, particularly in conjunction with step 206. Alternatively, the routine 300 can be employed if base station 16a determines that the reverse link channel has sufficiently degraded and mobile station 12 is not in a soft handoff condition, if all reverse link channels between base station 16a, 16b, etc., are degraded and mobile station 12 is in a soft handoff condition, etc.

In step 302, base station 16a receives the reverse link signal on the reverse link channel. In step 206, base station 16a again determines whether the quality of the reverse link channel is acceptable under methods described above with respect to step 204. If the quality of the reverse link channel is acceptable, then in step 304 base station 16a transmits a feedback control message to mobile station 12 instructing the mobile station to decrease the power of the transmitted reverse link signal. In response thereto, mobile station 12 decreases the transmission power of the reverse link signal by a small amount such as 0.5 dB.

Thereafter, the routine 300 loops back to step 302. The routine 300 can loop through steps 302, 206 and 304 until the power of the reverse link signal drops too low, or other factors degrade the quality of the reverse link channel. If so, then in step 306, base station 16a transmits a feedback control message to mobile station 12 instructing the mobile station to increase the transmission power of the reverse link signal. In response thereto, mobile station 12 appropriately increases the transmission power of the reverse link signal. Such an increase in the reverse link signal preferably is greater than the decrease amount under step 304, such as an increase amount of +1 dB.

In step 308, base station 16a determines whether mobile station 12 is in a soft handoff condition. In general, when mobile station 12 is in soft handoff, so as to simultaneously receive signals from, and transmit signals to, multiple base stations, the quality of each individual reverse link signal is usually worse than the quality of a received reverse link signal when the mobile station is not in soft handoff. For example, in a 2-way soft handoff condition, such as that shown in FIG. 2, the reliability of each independent reverse link signal need only be 90% to provide a combined reliability of 99%, particularly where the base station controller 14 relays correct power control messages to each base station 16a and 16b. As mobile station 12 enters into soft handoff, the quality of the reverse link signals received by base stations 16a and 16b typically degrade significantly. Consequently, the power of the forward link signals will deviate from the desired power level the forward link channel degrades, and calls can be dropped.

Since base stations 16a and 16b are in communication with base station controller 14, the base station controller can instruct the base stations when mobile station 12 enters soft handoff. As a result, in step 310 base station 16a provides feedback control messages to mobile station 12 to instruct the mobile station to increase the transmission power of its power control messages over the reverse link channel. Such an increase in the transmission power of the reverse link signal will compensate for typical degradations in the reverse link channel during soft handoff.

Under step 310, base station 16a also determines whether mobile station 12 is in a 2-, 3- or greater cell handoff condition. For example, if mobile station 12 is communicating simultaneously with base stations 16a, 16b and a third base station so as to be in a 3-cell handoff condition, base station 16a can request that the mobile station increase the transmission power of its reverse link signals by an amount greater than if the mobile station were only in a 2-cell handoff condition. Thereafter, or if base station 16a determines that mobile station 12 is not in a soft handoff condition Under step 308, routine 300 loops back to step 302 and again performs the above-described steps.

Although specific embodiments of, and examples for, the present invention are described herein for illustrative purposes, various equivalent modifications can be made without departing from the spirit and scope of the invention, as will be recognized by those skilled in the relevant art. While the exemplary embodiment of the present invention is described above as employing two modes of operation, such as those shown in FIGS. 3 and 4, the present invention can be readily adapted to operate under a continuum of different modes between the two modes of FIGS. 3 and 4. Additionally, while the exemplary embodiment of the present invention is generally described as employing a system of power control in a closed-loop communication system, certain aspects of the present invention can be employed independently. For example, the power control method of FIG. 8 can be employed in a communication system without the method of FIGS. 5A and 5B. Similarly, a communication system can employ only certain steps in the methods of FIGS. 5A and 5B and FIG. 8.

The teachings provided herein of the present invention can be applied to other communication systems, not necessarily the exemplary CDMA communication system described above. For example, the present invention is equally applicable to other digital or analog cellular communication systems. The present invention can also be modified, if necessary, to employ the systems, circuits and concepts of the various patents and applications described above, all of which are incorporated herein by reference as if set forth in their entirety.

These and other changes can be made to the invention in light of the above detailed description. In general, in the following claims, the terms used should not be construed to limit the invention to the specific embodiments disclosed in the specification and the claims, but should be construed to include any communication system that operates in accordance with the claims to provide channel quality monitoring and power control. Accordingly, the invention is not limited by the disclosure, but instead its scope is to be determined entirely by the following claims.

We claim:

1. In a communication system having at least one base station and at least one user station, wherein a user of said user station transmits signals to and receives communication signals from said base station, a method for controlling transmission signal power in said communication system, the method comprising the steps of:
   at said user station, determining a quality of a current communication signal received from said base station;
   at said user station, transmitting power control messages to said base station over a feedback channel based on said step of determining a quality of a current communication signal;
   determining that a quality of said feedback channel is unacceptable;
   at said base station, transmitting a new communication signal at an adjusted power level based on said step of determining that a quality of said feedback channel is unacceptable;
   at said base station, transmitting a feedback control message to said user station; and
   at said user station, adjusting said transmission of said power control messages to said base station in response to said feedback control message.

2. The method of claim 1 wherein the step of determining that a quality of said feedback channel is unacceptable includes the step of monitoring a quality of said power control messages transmitted by said user station.

3. The method of claim 1 wherein the step of transmitting power control messages to said base station includes the step of transmitting error detection bits with each of said power control messages, and
   wherein the step of determining that a quality of said feedback channel is unacceptable includes the steps of analyzing error detection bits of a current power control message, and determining that said current power control message is erroneous.

4. The method of claim 1 wherein the step of transmitting power control messages to said base station includes the step of transmitting error correction bits with each of said power control messages, and
   wherein the step of determining that a quality of said feedback channel is unacceptable includes the steps of:
   analyzing error correction bits of a current power control message,
   determining that said current power control message is erroneous, and
   correcting said current power control message.

5. The method of claim 1 wherein said communication system includes at least one base station controller coupled to said base station and to another base station, wherein the step of transmitting power control messages to said base station includes the step of transmitting said power control messages to said another base station, and
   wherein the step of determining that a quality of said feedback channel is unacceptable includes the steps of:
   receiving a previous power control message from said base station controller;
   comparing said previous power control message from said base station controller to a previous power control message received from said user station; and
   determining that said feedback channel is unacceptable based on said step of comparing.

6. The method of claim 1 wherein the step of transmitting a new communication signal at an adjusted power level includes the step of increasing a transmission power level of said new communication signal by a predetermined amount.

7. The method of claim 1 wherein the step of transmitting power control messages to said base station includes the step of transmitting said power control messages at a fast rate, and wherein the step of adjusting said transmission of said power control messages includes the step of transmitting said power control messages at a slow rate.

8. The method of claim 1 wherein the step of adjusting said transmission of said power control messages includes the step of repeating transmission of at least one previous power control message.

9. The method of claim 1 wherein the step of adjusting said transmission of said power control messages includes the step of transmitting said power control messages over an alternate feedback channel.

10. The method of claim 1 wherein said communication signal includes multiple frames, wherein the step of determining a quality of a current communication signal includes the step of determining a power level of a first number of windows of each frame;
   wherein the step of transmitting power control messages to said base station includes the step of transmitting power control messages corresponding to said power level of each of said first number of windows of each frame; and
   wherein the step of adjusting said transmission of said power control messages includes the steps of:
   determining a power level of a second number of windows of each frame, said second number being less than said first number, and transmitting power control messages corresponding to said power level of each of said second number of windows of each frame.

11. The method of claim 1 wherein said communication signal includes multiple frames, wherein the step of determining a quality of a current communication signal includes the step of determining a power level of a first set of windows of each frame;

wherein the step of transmitting power control messages to said base station includes the step of transmitting power control messages corresponding to said power level of each of said first set of windows of each frame; and wherein the step of adjusting said transmission of said power control messages includes the steps of:
determining a power level of a second set of windows of each frame, said second set having a greater duration than said first set, and
transmitting power control messages corresponding to said power level of each of said second set of windows of each frame.

12. The method of claim 1 wherein said communication signal includes multiple frames, wherein the step of determining a quality of a current communication signal includes the steps of receiving multiple windows of each frame of said current communication signal and determining a power level of each window;

wherein the step of transmitting power control messages to said base station includes the step of transmitting power control messages corresponding to said power level of each window; and wherein the step of adjusting said transmission of said power control messages includes the step of transmitting only a power control message corresponding a last window in each frame.

13. The method of claim 1 wherein said communication signal includes multiple frames, wherein the step of determining a quality of a current communication signal includes the steps of receiving multiple windows of each frame of said current communication signal and determining a power level of each window;

wherein the step of transmitting power control messages to said base station includes the step of transmitting power control messages corresponding to said power level of each window; and wherein the step of adjusting said transmission of said power control messages includes the step of transmitting only an average power control message corresponding to an average power level of each frame.

14. The method of claim 1 wherein said communication signal includes multiple frames, wherein the step of determining a quality of a current communication signal includes the steps of receiving multiple windows of each frame of said current communication signal and determining a power level of each window;

wherein the step of transmitting power control messages to said base station includes the step of transmitting power control messages corresponding to said power level of each window; and wherein the step of adjusting said transmission of said power control messages includes the step of transmitting only a weighted average power control message corresponding to a weighted average power level of each frame.

15. The method of claim 1 wherein said communication signal includes multiple frames, wherein the step of determining a quality of a current communication signal includes the steps of receiving multiple windows of each frame of said current communication signal and determining a power level of each window;

wherein the step of transmitting power control messages to said base station includes the step of transmitting power control messages corresponding to said power level of each window; and wherein the step of adjusting said transmission of said power control messages includes the step of transmitting only an average power control message corresponding to an average power level of a selected number of said windows, said selected number be greater or less than a number of windows of each frame.

16. The method of claim 1 wherein said communication signal includes multiple frames, wherein the step of determining a quality of a current communication signal includes the steps of receiving multiple windows of each frame of said current communication signal and determining power level signals which include said windows;

wherein the step of transmitting power control messages to said base station includes the step of transmitting power control messages corresponding to said power level signals; and wherein the step of adjusting said transmission of said power control messages includes the step of transmitting weighted average power control messages corresponding to weighted average power level of groups of windows, each of said groups of windows including at least one window from a corresponding previous group of windows.

17. The method of claim 1 wherein said communication signal includes multiple frames, and wherein the step of adjusting said transmission of said power control messages includes the steps of determining a symbol error rate for each frame received by said user station, and transmitting to said base station said determined symbol error rate for each frame.

18. The method of claim 1 wherein said communication signal includes multiple frames, and wherein the step of adjusting said transmission of said power control messages includes the steps of determining whether each frame received by said user station contains errors, and transmitting an error indicator message to said base station based on each frame determined to contain errors.

19. The method of claim 1 wherein said communication signal includes multiple frames, wherein the step of determining a quality of a current communication signal includes receiving multiple windows of each frame of said current communication signal and determining a power level of each window;

wherein the step of transmitting power control messages to said base station includes transmitting power control messages corresponding to said power level of each window; and wherein the step of adjusting said transmission of said power control messages includes transmitting only one power control message corresponding to each frame.

20. The method of claim 1 wherein the step of transmitting power control messages to said base station includes the step of transmitting power control messages each having greater than one bit; and wherein the step of adjusting said transmission of said power control messages to said base station includes the step of transmitting new power control messages each having only one bit.

21. The method of claim 1 wherein the step of adjusting said transmission of said power control messages includes the steps of:
  comparing current power levels of said communication signal within several windows to a threshold value;
  producing a net result value based on said comparison; and
  transmitting said net result value to said base station.

22. The method of claim 1 wherein the step of adjusting said transmission of said power control messages includes the step of inserting power control messages within a channel carrying voice signals transmitted to said base station.

23. The method of claim 1 wherein the step of adjusting said transmission of said power control messages includes the steps of transmitting said power control messages over said feedback channel to said base station, and transmitting alternative power control messages over an alternative channel to said base station.

24. The method of claim 1 wherein the step of adjusting said transmission of said power control messages includes the steps of comparing a current power level of said communication signal to a threshold power level, and transmitting power control messages having both a magnitude and polarity of difference based on said comparison.

25. The method of claim 1, further comprising the steps of:
  analyzing a plurality of previous power control messages with respect to plurality of previous, corresponding power levels as compared to a power level threshold;
  determining an error value based on said step of analyzing; and
  adjusting said power level threshold based on said error value.

26. The method of claim 1 wherein the step of adjusting said transmission of said power control messages includes the step of selecting one of a plurality of power measurement and feedback methods, each of said power measurement and feedback methods being ranked based on a quality of said feedback channel.

27. The method of claim 1 wherein the step of adjusting said transmission of said power control messages includes the step of selecting one of a plurality of power measurement and feedback methods.

28. The method of claim 1 wherein the step of adjusting said transmission of said power control messages includes the step of selecting one of a plurality of power measurement and feedback methods based on data within said feedback control message.

29. The method of claim 1 wherein said communication system includes at least one base station controller coupled to said base station and to another base station, wherein the step of transmitting power control messages to said base station includes the step of transmitting said power control messages to said another base station, and
  wherein the method further comprises the steps of:
    determining that several of said power control messages received from said user station are erroneous;
    ignoring subsequent power control messages received from said user station after determining that several of said power control messages received from said user station are erroneous; and
    receiving and employing power control messages from said base station controller.

30. The method of claim 1 wherein said communication system includes at least one base station controller coupled to said base station and to another base station, wherein the step of transmitting power control messages to said base station includes the step of transmitting said power control messages to said another base station over another feedback channel, and
  wherein the method further comprises the steps of:
    comparing said quality of said feedback channel to a quality of said another feedback channel;
    determining a best feedback channel based on said step of comparing;
    employing either said power control messages from said feedback channel or said power control messages from said another feedback channel based on said best feedback channel.

31. The method of claim 1 wherein said communication system includes at least one base station controller coupled to said base station and another base station, wherein the step of transmitting power control messages to said base station includes the step of transmitting said power control messages to said another base station, and
  wherein the step of determining that a quality of said feedback channel is unacceptable includes the steps of:
    interpreting said power control messages at said base station and said another base station to produce first and second interpreted messages, respectively;
    forwarding said first and second interpreted messages to said base station controller;
    deriving a best power control message based on said first and second interpreted messages; and
    providing said best power control message to said base station, and
    wherein the step of transmitting a new communication signal at an adjusted power level includes the step of transmitting a new communication signal at an adjusted power level based on said best power control message.

32. The method of claim 1 wherein said communication system includes at least one base station controller coupled to said base station and to another base station, wherein the step of transmitting power control messages to said base station includes the step of transmitting said power control messages to said another base station, and
  wherein the method further comprises the steps of:
    determining that several of said power control messages received from said user station are erroneous;
    ignoring subsequent power control messages received from said user station after determining that several of said power control messages received from said user station are erroneous;
    receiving batches of alternate power control messages from said base station controller; and
    adjusting a transmission power level of subsequent communication signals based on a last power control message in each of said batches of alternate power control messages.

33. The method of claim 1 wherein said communication system includes at least one base station controller coupled to said base station and to another base station, wherein the step of transmitting power control messages to said base station includes the step of transmitting said power control messages to said another base station, and
  wherein the method further comprises the steps of:
    determining that several of said power control messages received from said user station are erroneous;
    ignoring subsequent power control messages received from said user station after determining that several of said power control messages received from said user station are erroneous;

receiving batches of alternate power control messages from said base station controller;

producing average power control messages from said batches of alternate power control messages; and adjusting transmission power levels of subsequent communication signals based on said average power control messages.

34. The method of claim 1 wherein said communication system includes at least one base station controller coupled to said base station and to another base station, and wherein the method further comprises the steps of:

determining from said base station controller that transmission of communication signals to said mobile station is being handed-off from said base station to said another base station; and at said base station, increasing a transmission power level of subsequent communication signals by a predetermined amount until said hand-off of said transmission of communication signals is complete.

35. The method of claim 1 wherein the step of determining a quality of a current communication signal includes the step of receiving a code division multiple access (CDMA) spread spectrum communication signal.

36. In a communication system having at least one base station and at least one user station, said base station and said user station transmitting signals to each other, a method for controlling transmission signals in said communication system, the method comprising the steps of:

determining a quality of a currently received communication signal;

transmitting control messages over a feedback channel based on said quality of said currently received communication signal;

determining that a quality of said feedback channel is unacceptable;

transmitting a feedback control message after determining that said quality of said feedback channel is unacceptable; and adjusting said transmission of said control messages in response to said feedback control message.

37. The method of claim 36 wherein the step of determining a quality of a currently received communication signal includes the step of measuring a power of said currently received communication signal.

38. The method of claim 36, further comprising the step of transmitting a new communication signal at an adjusted power level based on said step of determining that a quality of said feedback channel is unacceptable.

39. The method of claim 36, further comprising the step of performing said steps of determining a quality of a currently received communication signal, transmitting control messages, determining that a quality of said feedback channel, transmitting a feedback control message and adjusting said transmission of said control messages at said user station.

40. The method of claim 36, further comprising the step of performing said steps of determining a quality of a currently received communication signal, transmitting control messages, determining that a quality of said feedback channel, transmitting a feedback control message and adjusting said transmission of said control messages at said base station.

41. The method of claim 36 wherein the step of determining that a quality of said feedback channel is unacceptable includes the step of monitoring a quality of said control messages.

42. The method of claim 36 wherein the step of transmitting control messages includes the step of transmitting error detection bits with each of said control messages, and wherein the step of determining that a quality of said feedback channel is unacceptable includes the steps of analyzing error detection bits of a first control message, and determining that said first control message is erroneous.

43. The method of claim 36 wherein the step of transmitting control messages includes the step of transmitting error correction bits with each of said control messages, and wherein the step of determining that a quality of said feedback channel is unacceptable includes the steps of:

analyzing error correction bits of a first control message, determining that said first control message is erroneous, and correcting said first control message.

44. The method of claim 36 wherein said communication system includes at least one base station controller coupled to said base station and to another base station, wherein the step of transmitting control messages includes the step of transmitting said control messages to said another base station, and wherein the step of determining that a quality of said feedback channel is unacceptable includes the steps of:

receiving another control message from said base station controller;

comparing said another control message from said base station controller to another control message received from said user station; and determining that said feedback channel is unacceptable based on said step of comparing.

45. The method of claim 36, further comprising the step of increasing a transmission power level of said new communication signal by a predetermined amount.

46. The method of claim 36 wherein the step of transmitting control messages includes the step of transmitting said control messages at a first rate, and wherein the step of adjusting said transmission of said control messages includes the step of transmitting said control messages at a second rate, the first and second rates differing.

47. The method of claim 36 wherein the step of adjusting said transmission of said control messages includes the step of repeating transmission of selected control messages.

48. The method of claim 36 wherein the step of adjusting said transmission of said control messages includes the step of transmitting said control messages over an alternate feedback channel.

49. The method of claim 36 wherein said communication signal includes multiple frames, wherein the step of determining a quality of a currently received communication signal includes the step of determining a level of a first number of windows of each frame;

wherein the step of transmitting control messages includes the step of transmitting control messages corresponding to said level of each of said first number of windows of each frame; and wherein the step of adjusting said transmission of said control messages includes the steps of:

determining a level of a second number of windows of each frame, said second number being different than said first number, and transmitting control messages corresponding to said level of each of said second number of windows of each frame.

50. The method of claim 36 wherein said communication signal includes multiple frames, wherein the step of determining a quality of a currently received communication signal includes the step of determining a level of a first set of windows of each frame;
   wherein the step of transmitting control messages includes the step of transmitting control messages corresponding to said level of each of said first set of windows of each frame; and
   wherein the step of adjusting said transmission of said control messages includes the steps of:
      determining a level of a second set of windows of each frame, said second set having a duration differing from said first set, and
      transmitting control messages corresponding to said level of each of said second set of windows of each frame.

51. The method of claim 36 wherein said communication signal includes multiple frames, wherein the step of determining a quality of a currently received communication signal includes the steps of receiving multiple windows of each frame of said current communication signal and determining a level of each window;
   wherein the step of transmitting control messages includes the step of transmitting control messages corresponding to said level of each window; and
   wherein the step of adjusting said transmission of said control messages includes the step of transmitting only a control message corresponding a last window in each frame.

52. The method of claim 36 wherein said communication signal includes multiple frames, wherein the step of determining a quality of a currently received communication signal includes the steps of receiving multiple windows of each frame of said current communication signal and determining a level of each window;
   wherein the step of transmitting control messages includes the step of transmitting control messages corresponding to said level of each window; and
   wherein the step of adjusting said transmission of said control messages includes the step of transmitting only an average control message corresponding to an average level of each frame.

53. The method of claim 36 wherein said communication signal includes multiple frames, wherein the step of determining a quality of a currently received communication signal includes the steps of receiving multiple windows of each frame of said current communication signal, and determining a level of each window;
   wherein the step of transmitting control messages includes the step of transmitting control messages corresponding to said level of each window; and
   wherein the step of adjusting said transmission of said control messages includes the step of transmitting only a weighted average control message corresponding to a weighted average level of each frame.

54. The method of claim 36 wherein said communication signal includes multiple frames, wherein the step of determining a quality of a currently received communication signal includes the steps of receiving multiple windows of each frame of said current communication signal and determining a level of each window;
   wherein the step of transmitting control messages includes the step of transmitting control messages corresponding to said level of each window; and
   wherein the step of adjusting said transmission of said control messages includes the step of transmitting only an average control message corresponding to an average level of a selected number of said windows, said selected number be greater or less than a number of windows of each frame.

55. The method of claim 36 wherein said communication signal includes multiple frames, wherein the step of determining a quality of a currently received communication signal includes the steps of receiving multiple windows of each frame of said current communication signal and determining level signals which include said windows;
   wherein the step of transmitting control messages includes the step of transmitting control messages corresponding to said level signals; and
   wherein the step of adjusting said transmission of said control messages includes the step of transmitting weighted average control messages corresponding to weighted average level of groups of windows, each of said groups of windows including at least one window from a corresponding previous group of windows.

56. The method of claim 36 wherein said communication signal includes multiple frames, and wherein the step of adjusting said transmission of said control messages includes the steps of determining a symbol error rate for each frame received by said user station, and transmitting said determined symbol error rate for each frame.

57. The method of claim 36 wherein said communication signal includes multiple frames, and wherein the step of adjusting said transmission of said control messages includes the steps of determining whether each frame contains errors, and transmitting an error indicator message based on each frame determined to contain errors.

58. The method of claim 36 wherein said communication signal includes multiple frames, wherein the step of determining a quality of a current communication signal includes receiving multiple windows of each frame of said current communication signal and determining a level of each window;
   wherein the step of transmitting control messages includes the steps of transmitting control messages corresponding to said level of each window; and
   wherein the step of adjusting said transmission of said control messages includes the steps of transmitting only one control message corresponding to each frame.

59. The method of claim 36 wherein the step of transmitting control messages includes the step of transmitting control messages each having greater than one bit; and
   wherein the step of adjusting said transmission of said control messages includes the step of transmitting new control messages each having only one bit.

60. The method of claim 36 wherein the step of adjusting said transmission of said control messages includes the steps of:
   comparing current levels of said communication signal within several windows to a threshold value;
   producing a net result value based on said comparison; and
   transmitting said net result value.

61. The method of claim 36 wherein the step of adjusting said transmission of said control messages includes the step of inserting control messages within a channel carrying voice signals.

62. The method of claim 36 wherein the step of adjusting said transmission of said control messages includes the steps of transmitting said control messages over said feedback channel, and transmitting alternative control messages over an alternative channel.

63. The method of claim 36 wherein the step of adjusting said transmission of said control messages includes the steps of comparing a level of said communication signal to a threshold level, and transmitting control messages having both a magnitude and polarity of difference based on said comparison.

64. The method of claim 36, further comprising the steps of:
analyzing a plurality of control messages with respect to a plurality of corresponding levels;
determining an error value based on said step of analyzing; and
transmitting an adjusted control message based on said error value.

65. The method of claim 36 wherein the step of adjusting said transmission of said control messages includes the step of selecting one of a plurality of measurement and feedback methods, each of said measurement and feedback methods being ranked based on a quality of said feedback channel.

66. The method of claim 36 wherein the step of adjusting said transmission of said control messages includes the step of selecting one of a plurality of measurement and feedback methods.

67. The method of claim 36 wherein the step of adjusting said transmission of said control messages includes the step of selecting one of a plurality of measurement and feedback methods based on data within said feedback control message.

68. The method of claim 36 wherein said communication system includes at least one base station controller coupled to said base station, and
wherein the method further comprises the steps of:
determining that several of said control messages are erroneous;
ignoring subsequent control messages after determining that several of said control messages are erroneous; and
receiving and employing control messages from said base station controller.

69. The method of claim 36 wherein said communication system includes at least one base station controller coupled to said base station and to another base station, wherein the step of transmitting control messages includes the step of transmitting said control messages to said another base station over another feedback channel, and
wherein the method further comprises the steps of:
comparing said quality of said feedback channel to a quality of said another feedback channel;
determining a best feedback channel based on said step of comparing;
employing either said control messages from said feedback channel or said control messages from said another feedback channel based on said best feedback channel.

70. The method of claim 36 wherein said communication system includes at least one base station controller coupled to said base station, and
wherein the step of determining that a quality of said feedback channel is unacceptable includes the steps of:
interpreting said control messages to produce first and second interpreted messages, respectively;
forwarding said first and second interpreted messages to said base station controller;
deriving a best control message based on said first and second interpreted messages; and
providing said best control message to said base station, and wherein the step of transmitting a new communication signal at an adjusted level includes the step of transmitting a new communication signal at an adjusted level based on said best control message.

71. The method of claim 36 wherein said communication system includes at least one base station controller coupled to said base station, and
wherein the method further comprises the steps of:
determining that several of said control messages are erroneous;
ignoring subsequent control messages after determining that several of said control messages are erroneous;
receiving batches of alternate control messages from said base station controller; and
adjusting a transmission level of subsequent communication signals based on a last control message in each of said batches of alternate control messages.

72. The method of claim 36 wherein said communication system includes at least one base station controller coupled to said base station, and
wherein the method further comprises the steps of:
determining that several of said control messages are erroneous;
ignoring subsequent power control messages after determining that several of said control messages are erroneous;
receiving batches of alternate control messages from said base station controller;
producing average control messages from said batches of alternate control messages; and
adjusting transmission levels of subsequent communication signals based on said average control messages.

73. The method of claim 36 wherein said communication system includes at least one base station controller coupled to said base station, and wherein the method further comprises the steps of:
determining that transmission of communication signals to said mobile station is being handed-off from said base station; and
increasing a transmission level of subsequent communication signals by a predetermined amount.

74. The method of claim 36 wherein the step of determining a quality of a currently received communication signal includes the step of receiving a code division multiple access (CDMA) spread spectrum communication signal.

75. In a communication system having at least one base station and at least one user station, said base station and said user station transmitting signals to each other, a system comprising:
means for analyzing a quality of a currently received communication signals;
means, coupled to said means for analyzing, for transmitting control messages over a feedback channel based on said quality of said currently received communication signal;
means for determining that a quality of said feedback channel is unacceptable;
means, coupled to said means for determining, for transmitting a feedback control message after determining that said quality of said feedback channel is unacceptable; and
means, coupled to said means for analyzing, for adjusting said transmission of said control messages in response to said feedback control message.

76. The system of claim 75 wherein said means for analyzing a quality of a currently received communication signal includes means for measuring a power of said currently received communication signal.

77. The system of claim 75, further comprising means for transmitting a new communication signal at an adjusted power level based on said determining that a quality of said feedback channel is unacceptable.

78. The system of claim 75 wherein said means for transmitting control messages includes means for transmitting error detection bits with each of said control messages, and
wherein said means for determining that a quality of said feedback channel is unacceptable includes means for analyzing error detection bits of a first control message, and determining that said current control message is erroneous.

79. The system of claim 75 wherein said communication system includes at least one base station controller coupled to said base station, wherein said means for transmitting control messages includes means for transmitting said control messages to said another base station, and
wherein said means for determining that a quality of said feedback channel is unacceptable includes means for receiving another control message from said base station controller, means for comparing said another control message from said base station controller to another control message received from said user station, and means for determining that said feedback channel is unacceptable based on said comparing.

80. The system of claim 75 wherein said means for transmitting control messages includes means for transmitting said control messages at a fast rate, and wherein said means for adjusting said transmission of said control messages includes means for transmitting said control messages at a slow rate.

81. The system of claim 75 wherein said means for adjusting said transmission of said control messages includes means for repeating transmission of selected control messages.

82. The system of claim 75 wherein said means for adjusting said transmission of said control messages includes means for transmitting said control messages over an alternate feedback channel.

83. The system of claim 75 wherein said communication signal includes multiple frames, wherein said means for analyzing a quality of a currently received communication signal includes means for determining a level of a first number of windows of each frame;
wherein said means for transmitting control messages includes means for transmitting control messages corresponding to said level of each of said first number of windows of each frame; and
wherein said means for adjusting said transmission of said control messages includes means for determining a level of a second number of windows of each frame, said second number being different than said first number, and means for transmitting control messages corresponding to said level of each of said second number of windows of each frame.

84. The system of claim 75 wherein said communication signal includes multiple frames, wherein said means for analyzing a quality of a currently received communication signal includes means for determining a level of a first set of windows of each frame;
wherein said means for transmitting control messages includes means for transmitting control messages corresponding to said level of each of said first set of windows of each frame; and
wherein said means for adjusting said transmission of said control messages includes means for determining a level of a second set of windows of each frame, said second set having a duration different from said first set, and means for transmitting control messages corresponding to said level of each of said second set of windows of each frame.

85. The system of claim 75 wherein said communication signal includes multiple frames, wherein said means for analyzing a quality of a currently received communication signal includes means for receiving multiple windows of each frame of said current communication signal and means for determining a level of each window;
wherein said means for transmitting control messages includes means for transmitting control messages corresponding to said level of each window; and
wherein said means for adjusting said transmission of said control messages includes means for transmitting only an average control message corresponding to an average level of each frame.

86. The system of claim 75 wherein said communication signal includes multiple frames, wherein said means for analyzing a quality of a current communication signal includes means for receiving multiple windows of each frame of said current communication signal and means for determining a level of each window;
wherein said means for transmitting control messages includes means for transmitting control messages corresponding to said level of each window; and
wherein said means for adjusting said transmission of said control messages includes means for transmitting only an average control message corresponding to an average level of a selected number of said windows, said selected number be greater or less than a number of windows of each frame.

87. The system of claim 75 wherein said communication signal includes multiple frames, wherein said means for analyzing a quality of a currently received communication signal includes means for receiving multiple windows of each frame of said current communication signal and means for determining level signals which include said windows;
wherein said means for transmitting control messages includes means for transmitting control messages corresponding to said level signals; and
wherein said means for adjusting said transmission of said control messages includes means for transmitting weighted average control messages corresponding to a weighted average level of groups of windows, each of said groups of windows including at least one window from a corresponding previous group of windows.

88. The system of claim 75 wherein said communication signal includes multiple frames, and wherein said means for adjusting said transmission of said control messages includes means for determining a symbol error rate for each frame, and means for transmitting said determined symbol error rate for each frame.

89. The system of claim 75 wherein said communication signal includes multiple frames, and wherein said means for adjusting said transmission of said control messages includes means for determining whether each frame contains errors, and means for transmitting an error indicator message based on each frame determined to contain errors.

90. The system of claim 75 wherein said means for adjusting said transmission of said control messages includes means for comparing current levels of said communication signal within several windows to a threshold value, means for producing a net result value based on said comparison, and means for transmitting said net result value.

91. The system of claim 75 wherein said means for adjusting said transmission of said control messages includes means for inserting control messages within a channel carrying voice signals.

92. The system of claim 75 wherein said means for adjusting said transmission of said control messages includes means for transmitting said control messages over said feedback channel, and means for transmitting alternative control messages over an alternative channel.

93. The system of claim 75 wherein said means for adjusting said transmission of said control messages includes means for selecting one of a plurality of measurement and feedback modes.

94. The system of claim 75 wherein said means for adjusting said transmission of said control messages includes means for selecting one of a plurality of measurement and feedback modes based on data within said feedback control message.

95. The system of claim 75 wherein said communication system includes at least one base station controller coupled to said base station, and
wherein the system further comprises:
means for determining that several of said control messages are erroneous;
means for ignoring subsequent control messages after determining that several of said control messages are erroneous; and
means for receiving and employing control messages from said base station controller.

96. The system of claim 75 wherein said communication system includes at least one base station controller coupled to said base station and to another base station, wherein said means for transmitting control messages includes means for transmitting said control messages to said another base station over another feedback channel, and
wherein the system further comprises:
means for comparing said quality of said feedback channel to a quality of said another feedback channel;
means for determining a best feedback channel based on said comparing;
means, coupled to said means for comparing, and means for determining a best channel, for employing either said control messages from said feedback channel or said control messages from said another feedback channel based on said best feedback channel.

97. The system of claim 75 wherein said communication system includes at least one base station controller coupled to said base station and to another base station, wherein said means for transmitting control messages includes means for transmitting said control messages to said another base station, and
wherein said means for determining that a quality of said feedback channel is unacceptable includes means for interpreting said control messages to produce first and second interpreted messages, respectively, means for forwarding said first and second interpreted messages to said base station controller, means for deriving a best control message based on said first and second interpreted messages, and means for providing said best control message, and
wherein said means for transmitting a new communication signal at an adjusted level includes means for transmitting a new communication signal at an adjusted level based on said best control message.

98. The system of claim 75 wherein said communication system includes at least one base station controller coupled to said base station, and
wherein the system further comprises:
means for determining that several of said control messages are erroneous;
means for ignoring subsequent control messages received based on said determining that several of said control messages are erroneous;
means for receiving batches of alternate control messages from said base station controller; and
means, coupled to said means for determining that several messages are erroneous, means for ignoring and means for receiving, for adjusting a transmission level of subsequent communication signals based on a last control message in each of said batches of alternate control messages.

99. The system of claim 75 wherein said communication system includes at least one base station controller coupled to said base station, and
wherein the system further comprises:
means for determining that several of said control messages are erroneous;
means for ignoring subsequent control messages after determining that several of said control messages are erroneous;
means for receiving batches of alternate control messages from said base station controller;
means for producing average control messages from said batches of alternate control messages; and
means, coupled to said means for determining that several messages and erroneous means for ignoring, means for receiving and means for producing, for adjusting transmission levels of subsequent communication signals based on said average control messages.

100. The system of claim 75 wherein said communication system includes at least one base station controller coupled to said base station, and wherein the system further comprises:
means for determining that transmission of communication signals to said mobile station is being handed-off from said base station; and
means for increasing a transmission level of subsequent communication signals by a predetermined amount.

101. In a communication system comprising:
at least one user station configured to determine a quality of a currently received communication signal and transmit control messages over a feedback channel based on said quality of said currently received communication signal;
a base station configured to determine that a quality of said feedback channel is unacceptable and transmit a feedback control message after determining that said quality of said feedback channel is unacceptable, and
wherein said user station is further configured to adjust power control messages transmitted to said base station by said transmitter in response to said feedback control message.

102. The system of claim 101 wherein said user station is further configured for measuring a power of said currently received communication signal.

103. The system of claim 101 wherein said base station is further configured for transmitting a new communication signal at an adjusted power level when said feedback channel is determined unacceptable.

104. The system of claim 101 wherein said base station is further configured for monitoring a quality of said control messages.

105. The system of claim 101 wherein said user station is further configured for transmitting error detection bits with each of said control messages, and wherein said base station is further configured for analyzing error detection bits of a first control message, and determining that said first control message is erroneous.

106. The system of claim 101 wherein said user station is further configured for transmitting error correction bits with each of said control messages, and wherein said base station is further configured for analyzing error correction bits of a first control message, determining that said first control message is erroneous, and correcting said first control message.

107. The system of claim 101 wherein said communication system includes at least one base station controller coupled to said base station and to another base station, wherein said user station is further configured for transmitting said control messages to said another base station, and wherein said base station is further configured for:
receiving another control message from said base station controller;
comparing said another control message from said base station controller to another control message received from said user station; and
determining that said feedback channel is unacceptable based on said comparing.

108. The system of claim 101 wherein said base station is further configured for increasing a transmission power level of said new communication signal by a predetermined amount.

109. The system of claim 101 wherein said user station is further configured for transmitting said control messages at a first rate, and wherein said user station is further configured for transmitting said control messages at a second rate in response to said feedback control message, the first and second rates differing.

110. The system of claim 101 wherein said user station is further configured for repeating transmission of selected control messages in response to said feedback control message.

111. The system of claim 101 wherein said user station is further configured for transmitting said control messages over an alternate feedback channel in response to said feedback control message.

112. The system of claim 101 wherein said communication signal includes multiple frames, wherein said user station is configures for determining a level of a first number of windows of each frame, and transmitting control messages corresponding to said level of each of said first number of windows of each frame; and wherein said user station is further configured for determining a level of a second number of windows of each frame, said second number being different than said first number, and transmitting control messages corresponding to said level of each of said second number of windows of each frame in response to said feedback control message.

113. The system of claim 101 wherein said communication signal includes multiple frames, wherein said user station is configured for determining a level of a first set of windows of each frame, and transmitting control messages corresponding to said level of each of said first set of windows of each frame; and wherein said user station is further configured for determining a level of a second set of windows of each frame, said second set having a duration differing from said first set, and transmitting control messages corresponding to said level of each of said second set of windows of each frame in response to said feedback control message.

114. The system of claim 101 wherein said communication signal includes multiple frames, wherein said user station is configured for receiving multiple windows of each frame of said current communication signal, determining a level of each window, and transmitting control messages corresponding to said level of each window;

wherein said user station is further configured for, and transmitting only a control message corresponding a last window in each frame in response to said feedback control message.

115. The system of claim 101 wherein said communication signal includes multiple frames, wherein said user station is configure for receiving multiple windows of each frame of said current communication signal, determining a level of each window, and transmitting control messages corresponding to said level of each window, and wherein said user station is further configures for transmitting only an average control message corresponding to an average level of each frame in response to said feedback control message.

116. The system of claim 101 wherein said communication signal includes multiple frames, wherein said user station is configured for receiving multiple windows of each frame of said current communication signal, determining a level of each window, and transmitting control messages corresponding to said level of each window, and wherein said user station is further configured for transmitting only a weighted average control message corresponding to a weighted average level of each frame in response to said feedback control message.

117. The system of claim 101 wherein said communication signal includes multiple frames, wherein said user station is configured for receiving multiple windows of each frame of said current communication signal and determining a level of each window; and wherein said user station is further configured for transmitting control messages corresponding to said level of each window, and transmitting only an average control message corresponding to an average level of a selected number of said windows in response to said feedback control message, said selected number be greater or less than a number of windows of each frame.

118. The system of claim 101 wherein said communication signal includes multiple frames, wherein said user station is configured for receiving multiple windows of each frame of said current communication signal and determining level signals which include said windows; and wherein said user station is further configured for transmitting control messages corresponding to said level signals, and transmitting weighted average control messages corresponding to weighted average level of groups of windows in response to said feedback control message, each of said groups of windows including at least one window from a corresponding previous group of windows.

119. The system of claim 101 wherein said communication signal includes multiple frames, and wherein said user station is further configured for determining a symbol error rate for each frame received by said user station, and transmitting said determined symbol error rate for each frame in response to said feedback control message.

120. The system of claim 101 wherein said communication signal includes multiple frames, and wherein said user station is further configured for determining whether each frame contains errors, and transmitting an error indicator message based on each frame determined to contain errors in response to said feedback control message.

121. The system of claim 101 wherein said communication signal includes multiple frames, wherein said user station is configured for receiving multiple windows of each frame of said current communication signal and determining a level of each window; and
  wherein said user station is configured for transmitting control messages corresponding to said level of each window, and transmitting only one control message corresponding to each frame in response to said feedback control message.

122. The system of claim 101 wherein said user station is configured for transmitting control messages each having greater than one bit; and
  wherein said user station is further configured for transmitting new control messages each having only one bit in response to said feedback control message.

123. The system of claim 101 wherein said user station is further configured for comparing current levels of said communication signal within several windows to a threshold value, producing a net result value based on said comparison, and transmitting said net result value in response to said feedback control message.

124. The system of claim 101 wherein said user station is further configured for inserting control messages within a channel carrying voice signals in response to said feedback control message.

125. The system of claim 101 wherein said user station is further configured for transmitting said control messages over said feedback channel, and transmitting alternative control messages over an alternative channel in response to said feedback control message.

126. The system of claim 101 wherein said user station is further configured for comparing a level of said communication signal to a threshold level, and transmitting control messages having both a magnitude and polarity of difference based on said comparison.

127. The system of claim 101 wherein said user station is configured for analyzing a plurality of control messages with respect to a plurality of corresponding levels, determining an error value based on said analyzing, and transmitting an adjusted control message based on said error value in response to said feedback control message.

128. The system of claim 101 wherein said user station is further configured for selecting one of a plurality of measurement and feedback modes in response to said feedback control message, each of said measurement and feedback modes being ranked based on a quality of said feedback channel.

129. The system of claim 101 wherein said user station is further configured for selecting one of a plurality of measurement and feedback modes in response to said feedback control message.

130. The system of claim 101 wherein said user station is further configured for selecting one of a plurality of measurement and feedback modes based on data within said feedback control message.

131. The system of claim 101 wherein said communication system includes at least one base station controller coupled to said base station, and
  wherein said base station is further configured for determining that several of said control messages are erroneous, ignoring subsequent control messages after determining that several of said control messages are erroneous, and receiving and employing control messages from said base station controller.

132. The system of claim 101 wherein said communication system includes at least one base station controller coupled to said base station and to another base station, wherein said user station is further configured for transmitting said control messages to said another base station over another feedback channel, and
  wherein said base station is further configured for comparing said quality of said feedback channel to a quality of said another feedback channel, determining a best feedback channel based on said comparing, and employing either said control messages from said feedback channel or said control messages from said another feedback channel based on said best feedback channel.

133. The system of claim 101 wherein said communication system includes at least one base station controller coupled to said base station, and
  wherein said base stations are configured for interpreting said control messages to produce first and second interpreted messages, respectively, and forwarding said first and second interpreted messages to said base station controller;
  wherein said base station controller is configured for deriving a best control message based on said first and second interpreted messages, and providing said best control message to said base station, and
  wherein said base station is further configured for transmitting a new communication signal at an adjusted level based on said best control message.

134. The system of claim 101 wherein said communication system includes at least one base station controller coupled to said base station, and
  wherein said base station is further configured for determining that several of said control messages are erroneous, ignoring subsequent control messages after determining that several of said control messages are erroneous, receiving batches of alternate control messages from said base station controller, and adjusting a transmission level of subsequent communication signals based on a last control message in each of said batches of alternate control messages.

135. The system of claim 101 wherein said communication system includes at least one base station controller coupled to said base station, and
  wherein said base station is further configured for determining that several of said control messages are erroneous, ignoring subsequent power control messages after determining that several of said control messages are erroneous, receiving batches of alternate control messages from said base station controller, producing average control messages from said batches of alternate control messages, and adjusting transmission levels of subsequent communication signals based on said average control messages.

136. The system of claim 101 wherein said communication system includes at least one base station controller coupled to said base station, and wherein said base station is further configured for determining that transmission of communication signals to said mobile station is being handed-off from said base station, and increasing a transmission level of subsequent communication signals by a predetermined amount.

137. The system of claim 101 wherein said processor is further configured for receiving a code division multiple access (CDMA) spread spectrum communication signal.

138. In a communication system having a base station, a user station exchanging signals with said base station, said user station comprising:

- a receiver that receives a current signal and a feedback control message from said base station;
- a measurement circuit coupled to receive said current signal and configured to determine a level of said current signal;
- a transmitter that transmits a current control message to said base station, said current control message corresponding to said level of said current signal; and
- a processor coupled to said receiver, said transmitter and said measurement circuit, said processor being configured to adjust control messages transmitted to said base station by said transmitter in response to said feedback control message.

139. The user station of claim 138 wherein said measurement circuit and said processor are a microprocessor.

140. In a communication system having a base station and a user station, an apparatus comprising:

- a receiver circuit that receives a current signal and a feedback control message from a first station, said first station being one of said base station and said user station;
- a transmitter that transmits a current control message to a second station corresponding to a level of said current signal; and
- a processor coupled to said receiver circuit and said transmitter, said processor being configured to determine said level of said current signal and to adjust power control messages transmitted to said first station by said transmitter in response to said feedback control message.

141. The apparatus of claim 140 wherein said user station includes said receiver circuit and said processor, and wherein said receiver circuit includes a measurement circuit configured to determine a power level of said current signal.

142. The apparatus of claim 140 wherein said processor is further configured for measuring a power of said currently received communication signal.

\* \* \* \* \*